United States Patent
Miguel Sánchez

(10) Patent No.: US 12,163,835 B2
(45) Date of Patent: Dec. 10, 2024

(54) LINEAR TEMPERATURE CALIBRATION COMPENSATION FOR SPECTROMETER SYSTEMS

(71) Applicant: ams Sensors Singapore Pte. Ltd., Singapore (SG)

(72) Inventor: Javier Miguel Sánchez, Zurich (CH)

(73) Assignee: AMS Sensors Singapore Pte. Ltd., Singapore (SG)

( * ) Notice: Subject to any disclaimer, the term of this patent is extended or adjusted under 35 U.S.C. 154(b) by 94 days.

(21) Appl. No.: 17/299,908

(22) PCT Filed: Dec. 17, 2019

(86) PCT No.: PCT/SG2019/050616
§ 371 (c)(1),
(2) Date: Jun. 4, 2021

(87) PCT Pub. No.: WO2020/130940
PCT Pub. Date: Jun. 25, 2020

(65) Prior Publication Data
US 2022/0026273 A1     Jan. 27, 2022

Related U.S. Application Data

(60) Provisional application No. 62/783,622, filed on Dec. 21, 2018.

(51) Int. Cl.
*G01J 3/02*     (2006.01)
*G01J 3/12*     (2006.01)
(Continued)

(52) U.S. Cl.
CPC .............. *G01J 3/0286* (2013.01); *G01J 3/26* (2013.01); *G01J 3/45* (2013.01); *G01J 2003/1247* (2013.01)

(58) Field of Classification Search
CPC .............. G01J 3/0286; G01J 3/26; G01J 3/45
See application file for complete search history.

(56) References Cited

U.S. PATENT DOCUMENTS

| | | |
|---|---|---|
| 5,892,582 A | 4/1999 | Bao et al. |
| 2005/0152015 A1 | 7/2005 | Anderson et al. |

(Continued)

FOREIGN PATENT DOCUMENTS

| | | |
|---|---|---|
| CN | 101004477 A | 7/2007 |
| CN | 102478429 A | 5/2012 |

(Continued)

OTHER PUBLICATIONS

International Search Report and Written Opinion for Application No. PCT/SG2019/050616 dated Mar. 13, 2020 (10 pages).

(Continued)

*Primary Examiner* — Uzma Alam
*Assistant Examiner* — Huy Phillip Pham
(74) *Attorney, Agent, or Firm* — Viering, Jentschura & Partner mbB

(57) ABSTRACT

In an example method, light is emitted towards a sample region, and sample light is received at an interferometer. A subset of the sample light is transmitted from the interferometer to a detector. Transmitting the subset of the sample light includes determining a reference voltage corresponding to the range of wavelengths of the subset of sample light, and a reference temperature. Transmitting the subset of sample light also includes determining a temperature of an environment, determining a bias voltage corresponding to a difference between the reference temperature and the temperature of the environment, and applying, to the interferometer, an input voltage corresponding to the sum of the reference voltage and the bias voltage. The subset of the sample light is measured by the detector, and a spectral (Continued)

distribution of light is determined based on the measurements.

10 Claims, 17 Drawing Sheets

(51) Int. Cl.
  *G01J 3/26* (2006.01)
  *G01J 3/45* (2006.01)

(56) References Cited

U.S. PATENT DOCUMENTS

| | | |
|---|---|---|
| 2010/0292581 A1 | 11/2010 | Howard et al. |
| 2011/0032529 A1* | 2/2011 | Wan ........................ G01J 3/45 |
| | | 356/243.1 |
| 2012/0133947 A1 | 5/2012 | Nozawa |
| 2014/0071445 A1 | 3/2014 | Matsushita et al. |
| 2014/0091211 A1 | 4/2014 | Kitahara |
| 2014/0168636 A1 | 6/2014 | Funamoto |
| 2014/0253921 A1 | 9/2014 | Chen |
| 2017/0350760 A1 | 12/2017 | Antila et al. |
| 2017/0350761 A1* | 12/2017 | Varpula ................. G02B 26/001 |
| 2018/0270381 A1* | 9/2018 | Ikuta .................. H04N 1/00896 |

FOREIGN PATENT DOCUMENTS

| | | |
|---|---|---|
| CN | 105547456 A | 5/2016 |
| EP | 2028463 A1 | 2/2009 |
| EP | 3404380 A1 | 11/2018 |
| JP | 2007518138 A | 7/2007 |
| WO | 0214971 A1 | 2/2002 |
| WO | 0239553 A2 | 5/2002 |
| WO | WO-2016071572 A1 * | 5/2016 ............ G01J 3/0202 |

OTHER PUBLICATIONS

Chinese office action issued for the corresponding Chinese patent application No. 201980085288.8, dated Nov. 29, 2023, 10 pages (for informational purposes only).

* cited by examiner

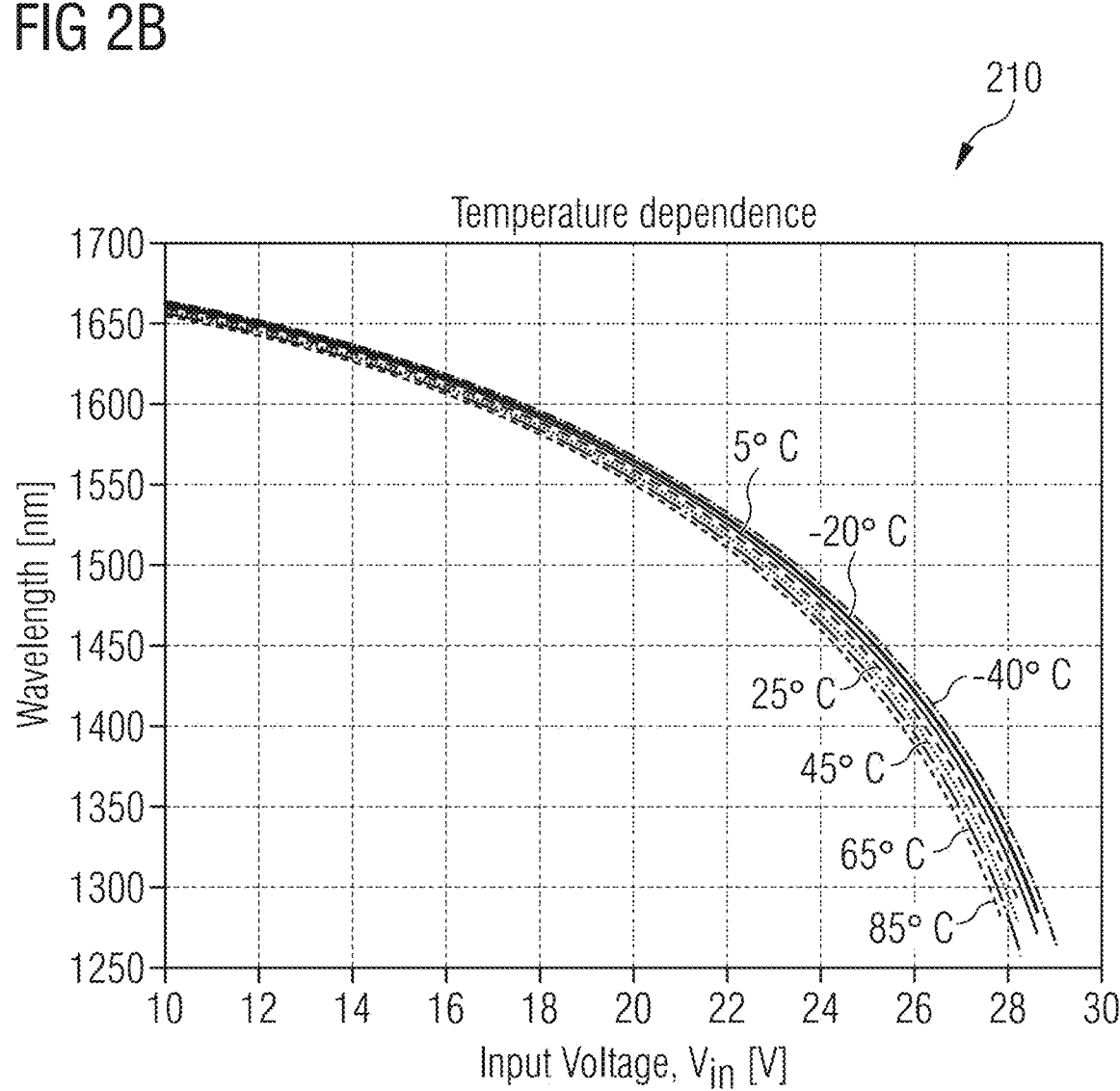

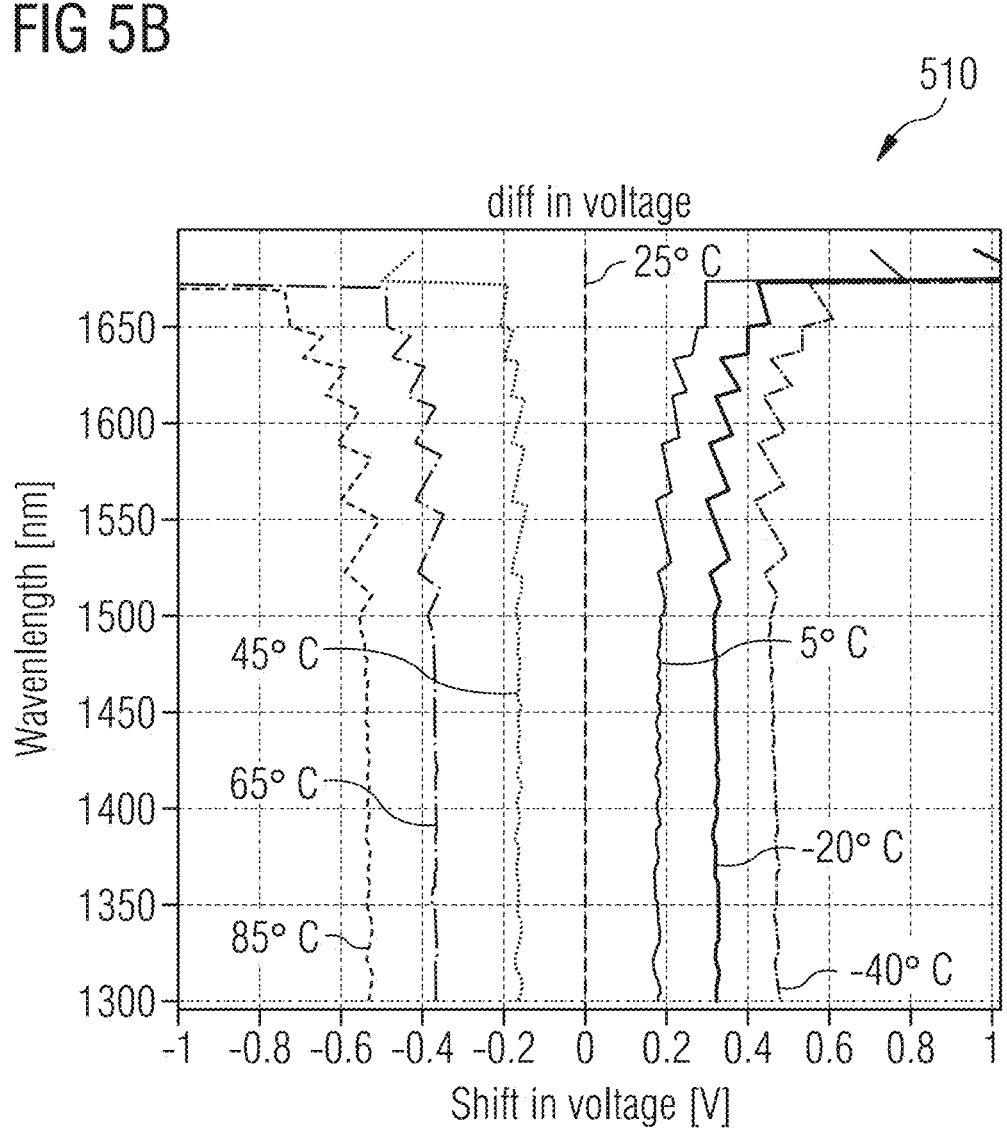

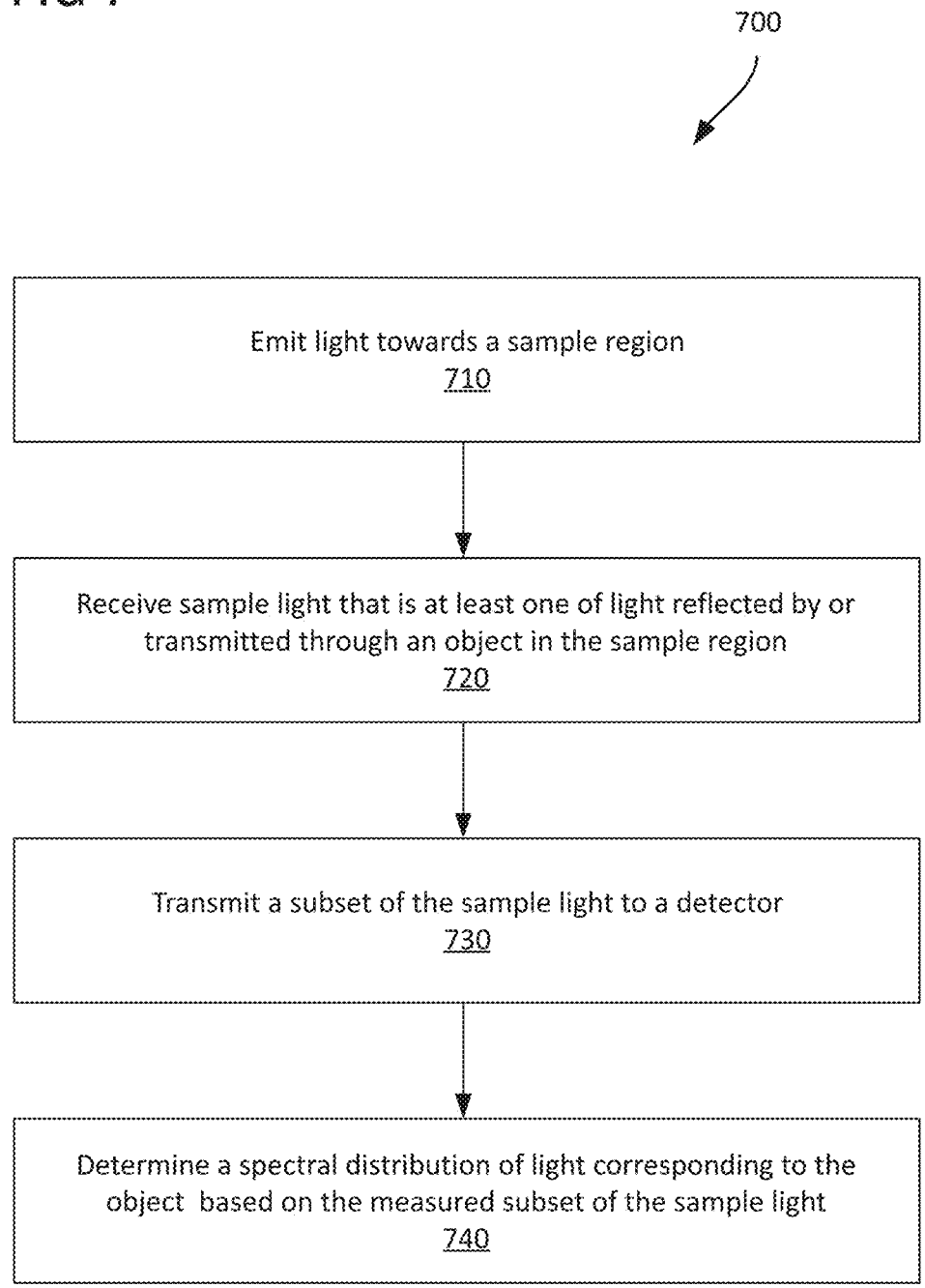

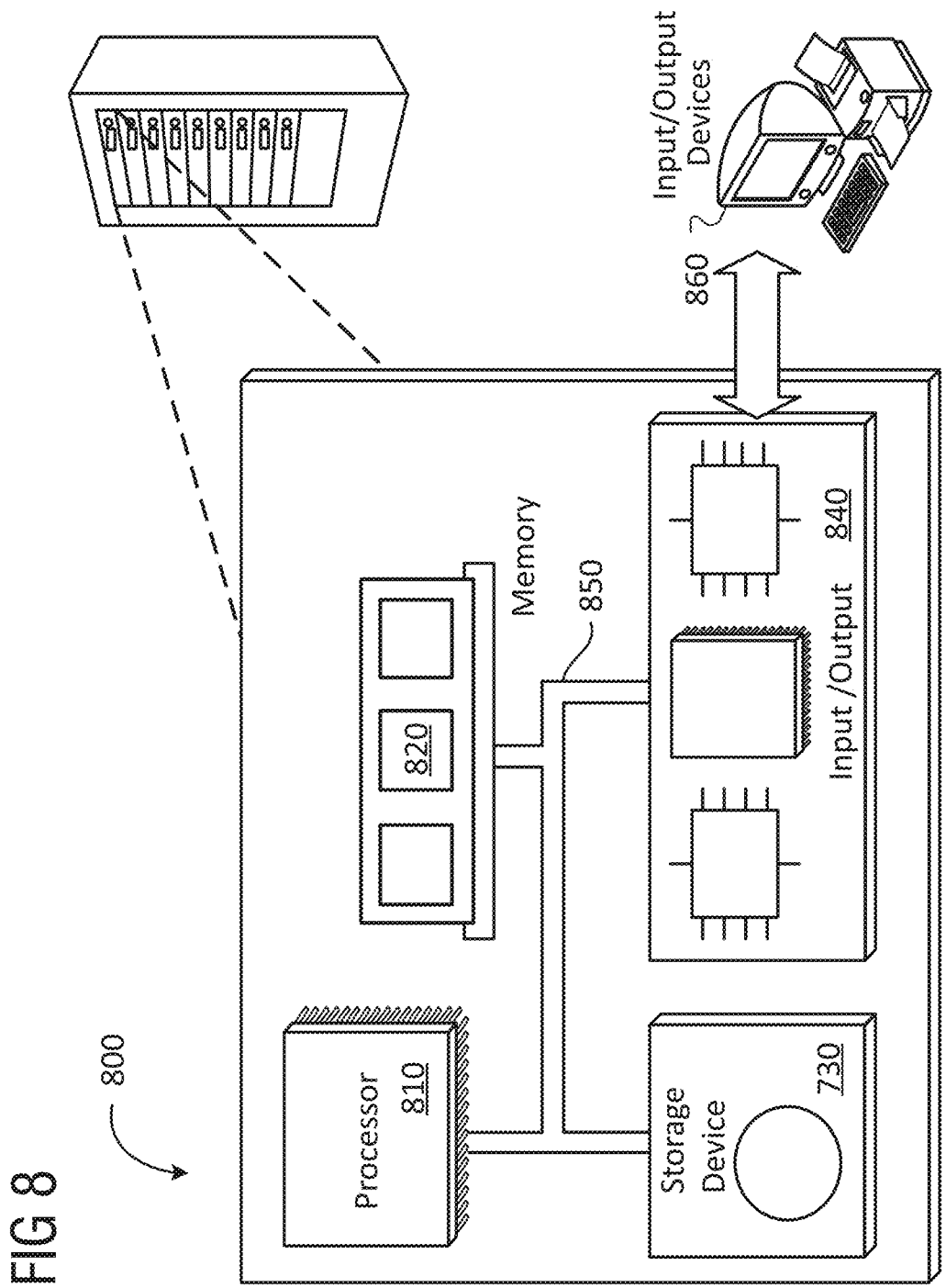

LINEAR TEMPERATURE CALIBRATION COMPENSATION FOR SPECTROMETER SYSTEMS

TECHNICAL FIELD

The disclosure relates to spectrometers.

BACKGROUND

A spectrometer is an instrument used to measure a light spectrum of sample light (e.g., to determine the spectral components of ultraviolet, visible, and/or infrared light). In some cases, spectrometers can determine the intensity of light as a function of wavelength or of frequency.

Spectrometers can be used for a variety of different applications. For example, spectrometers can be used to conduct environmental analyses, industrial monitoring, color measurements, and pharmacological studies.

A light spectrum can be measured in different ways, such as through direct measurement or indirect measurement. As an example, a spectrometer configured for direct measurement can separate different wavelengths of light spatially (e.g., using wavelength dispersive devices, such as diffractive gratings or prisms), and measure the power distribution of each wavelength of light individually (e.g., to "directly" measure the spectrum with respect to specific wavelengths).

As another example, a spectrometer configured for indirect measurement can modulate light according to a series of known spectral modulation patterns, and obtain measurements of the modulated light. Each measurement provides information carried by multiple wavelengths and according to different weights, and can be used to reconstruct the spectrum of the original light (e.g., using a multiplexing technique).

SUMMARY

A spectrometer system can be used to determine information regarding a sample (e.g., an object) based on the properties of light reflected from and/or transmitted through the sample. As an example, a spectrometer system can include a light source that emits light (e.g., light having known spectral properties) toward the sample, and a detector that measures light reflected from and/or transmitted through the sample. The spectrometer system can determine the spectral properties of the reflected and/or transmitted light (e.g., the distribution of light with respect to a range of wavelengths), and determine information regarding the sample based on these measurements. As an example, the spectrometer system can determine the physical shape or profile of the sample, the characteristics of the surface of the sample, and/or the composition of the sample.

In some cases, a spectrometer system can measure light according to a specific wavelength or range of wavelengths. This can be useful, for example, as light measurements with respect to certain wavelengths or ranges of wavelengths may be particularly useful in determining the properties of the sample (e.g., compared to light measurement with respect to other wavelengths or ranges of wavelengths). Accordingly, the spectrometer system can selectively measure light within specific wavelengths or ranges of wavelengths (e.g., those that provide more information and/or more desirable information regarding the sample), while not measuring light within other wavelengths or ranges of wavelengths (e.g., those that provide less information and/or less desirable information regarding the sample) to improve the efficiency and accuracy of measurements.

In some cases, a spectrometer system can measure light according to a specific wavelength or range of wavelengths using an interferometer. An interferometer is a device that uses light interference (e.g., by super-positioning light waves) to extract information from the light. As an example, an interferometer can receive reflected and/or transmitted light from a sample, and through a super-positioning of the received light according to different phases, selectively transmit a subset of the light having a particular wavelength or range of wavelengths to the detector for measurement. Accordingly, the detector does not measure the entirety of the light received from the sample, but rather a limited subset of the received light that is selectively transmitted by the interferometer.

In some cases, an interferometer can be "tunable," such that a system or user can specify a particular wavelength or ranges of wavelengths of light that is transmitted by the interferometer for measurement. As an example, the output of a tunable interferometer depend on an input voltage that is applied to the interferometer. The input voltage can be varied to adjust the wavelength or range of wavelengths of light that is selectively transmitted by the interferometer to the detector for measurement.

However, in some cases, the output of an interferometer can also depend on the temperature of the surrounding environment. Accordingly, in response to a particular input voltage, an interferometer may output light within different wavelengths or ranges of wavelengths due to temperature fluctuations in the surrounding environment. These variations can reduce the accuracy and/or precision of a spectrometer system's measurements, particularly when the spectrometer system is used in different environments and/or in an unregulated environment.

To enhance the performance of the spectrometer system, the spectrometer system can calibrate the input voltage that is applied to the interferometer based on a measured temperature of the surrounding environment. For example, a spectrometer system can determine a reference voltage that, when applied to the interferometer, causes the interferometer to output light within a certain wavelength or range of wavelengths with respect to a reference temperature. Further, the spectrometer system can measure the temperature of the surrounding environment, and determine a bias voltage to compensate for the difference between the reference temperature and the measured temperature. In some cases, the bias voltage can be the sum of the measured temperature multiplied by a scalar value, and a constant value. The spectrometer system can apply a calibrated input voltage (e.g., a sum of the reference voltage and the bias voltage) to the interferometer, such that the interferometer outputs the selected wavelength or range of wavelengths of light to the detector. This enables the spectrometer system to compensate for fluctuations in temperature, and make more accurate and/or precise measurements. Further, this enables the spectrometer system to be used in a wider range of environments and environmental conditions.

In an aspect, a method includes emitting, using a light source of a spectrometer, light towards a sample region, and receiving, at an interferometer of the spectrometer, sample light that is at least one of light reflected by or transmitted through an object in the sample region. The sample light has a first range of wavelengths. Further, the method includes transmitting, from the interferometer to a detector of the spectrometer, a subset of the sample light. The subset of the sample light has a second range of wavelengths. The second range of wavelengths is a subset of the first range of wavelengths. Transmitting the subset of the sample light includes determining a reference voltage corresponding to the second range of wavelengths and a reference temperature, and determining, using a temperature sensor, a temperature of an environment of the spectrometer. Transmitting the subset of the sample light also includes determining a bias voltage corresponding to a difference between the reference temperature and the temperature of the environment of the spectrometer, and applying, to the interferometer, an input voltage corresponding to the sum of the reference voltage and the bias voltage. The method also includes measuring, using the detector, the subset of the sample light; and determining, using an electronic control device, a spectral distribution of light corresponding to the object based on the measured subset of the sample light.

Implementations of this aspect can include one or more of the following features.

In some implementations the bias voltage ca be a sum of (i) the temperature of the environment of the spectrometer multiplied by a scalar value, and (ii) a constant value.

In some implementations, the reference voltage can correspond to a second input voltage that, when applied to the interferometer, causes the interferometer to transmit the subset of the sample light when the temperature of the environment of the spectrometer is the reference temperature.

In some implementations, applying the input voltage can include generating, using the electronic control device, a command signal instructing a voltage source to apply the input voltage to the interferometer, and applying, using the voltage source in response to the command signal, the voltage source to the interferometer.

In some implementations, applying the input voltage can include generating, using the electronic control device, a command signal instructing a voltage source to generate the reference voltage, and generating, using the voltage source in response to the command signal, the reference voltage. Further, applying the input voltage can include generating, using the voltage source, the bias voltage based on the measured temperature of the environment of the spectrometer, and applying, using the voltage source in response to the command signal, the sum of the reference voltage and the bias voltage to the interferometer.

In another aspect, a system includes a light source operable to emit light towards a sample region, an interferometer, a detector, and an electronic control device. The light source is operable to emit light towards a sample region. The interferometer is operable to receive sample light that is at least one of light reflected by or transmitted through an object in the sample region. The sample light has a first range of wavelengths. The interferometer also is operable to transmit, from the interferometer to the detector, a subset of the sample light. The subset of the sample light has a second range of wavelengths. The second range of wavelengths is a subset of the first range of wavelengths. Transmitting the subset of the sample light includes determining a reference voltage corresponding to the second range of wavelengths and a reference temperature, and determining, using a temperature sensor, a temperature of an environment of the spectrometer. Transmitting the subset of the sample light also includes determining a bias voltage corresponding to a difference between the reference temperature and the temperature of the environment of the spectrometer, and applying, to the interferometer, an input voltage corresponding to the sum of the reference voltage and the bias voltage. The detector is operable to measure the subset of the sample light. The electronic control device is operable to determine a spectral distribution of light corresponding to the object based on the measured subset of the sample light.

Implementations of this aspect can include one or more of the following features.

In some implementations, the bias voltage can be a sum of (i) the temperature of the environment of the spectrometer multiplied by a scalar value, and (ii) a constant value.

In some implementations, the reference voltage can correspond to a second input voltage that, when applied to the interferometer, causes the interferometer to transmit the subset of the sample light when the temperature of the environment of the spectrometer is the reference temperature.

In some implementations, the system can further include a voltage source. Applying the input voltage can include generating, using the electronic control device, a command signal instructing a voltage source to apply the input voltage to the interferometer, and applying, using the voltage source in response to the command signal, the voltage source to the interferometer.

In some implementations, the system can further include a voltage source. Applying the input voltage can include generating, using the electronic control device, a command signal instructing a voltage source to generate the reference voltage, and generating, using the voltage source in response to the command signal, the reference voltage. Applying the input voltage also can include generating, using the voltage source, the bias voltage based on the measured temperature of the environment of the spectrometer, and applying, using the voltage source in response to the command signal, the sum of the reference voltage and the bias voltage to the interferometer.

The details of one or more implementations are set forth in the accompanying drawings and the description below. Other features and advantages will be apparent from the description and drawings, and from the claims.

BRIEF DESCRIPTION OF DRAWINGS

FIG. 2B is a plot showing an example relationship between the input voltage applied to an interferometer and a corresponding wavelength of light outputted by the interferometer with respect to several different temperatures.

FIGS. 5A-5E show experimental data obtained during operation of an example interferometer.

FIG. 7 is a flow chart diagram of an example process for measuring a spectral distribution of light reflected from and/or transmitted through a sample FIG. 8 is a schematic diagram of an example computer system.

DETAILED DESCRIPTION

This disclosure describes implementations of a spectrometer system for measuring the spectral distribution of light reflected from and/or transmitted through a sample. Implementations of the spectrometer system include a voltage-tunable interferometer for selecting particular wavelengths or ranges of wavelengths of light for measurement. To account for temperature-induced variations in the output of the interferometer, the spectrometer system can calibrate the input voltage that is applied to the interferometer based on a measured temperature of the surrounding environment. This enables the spectrometer system to compensate for fluctuations in temperature, and make more accurate and/or precise measurements. Further, this enables the spectrometer system to be used in a wider range of environments and environmental conditions.

Figure 1:
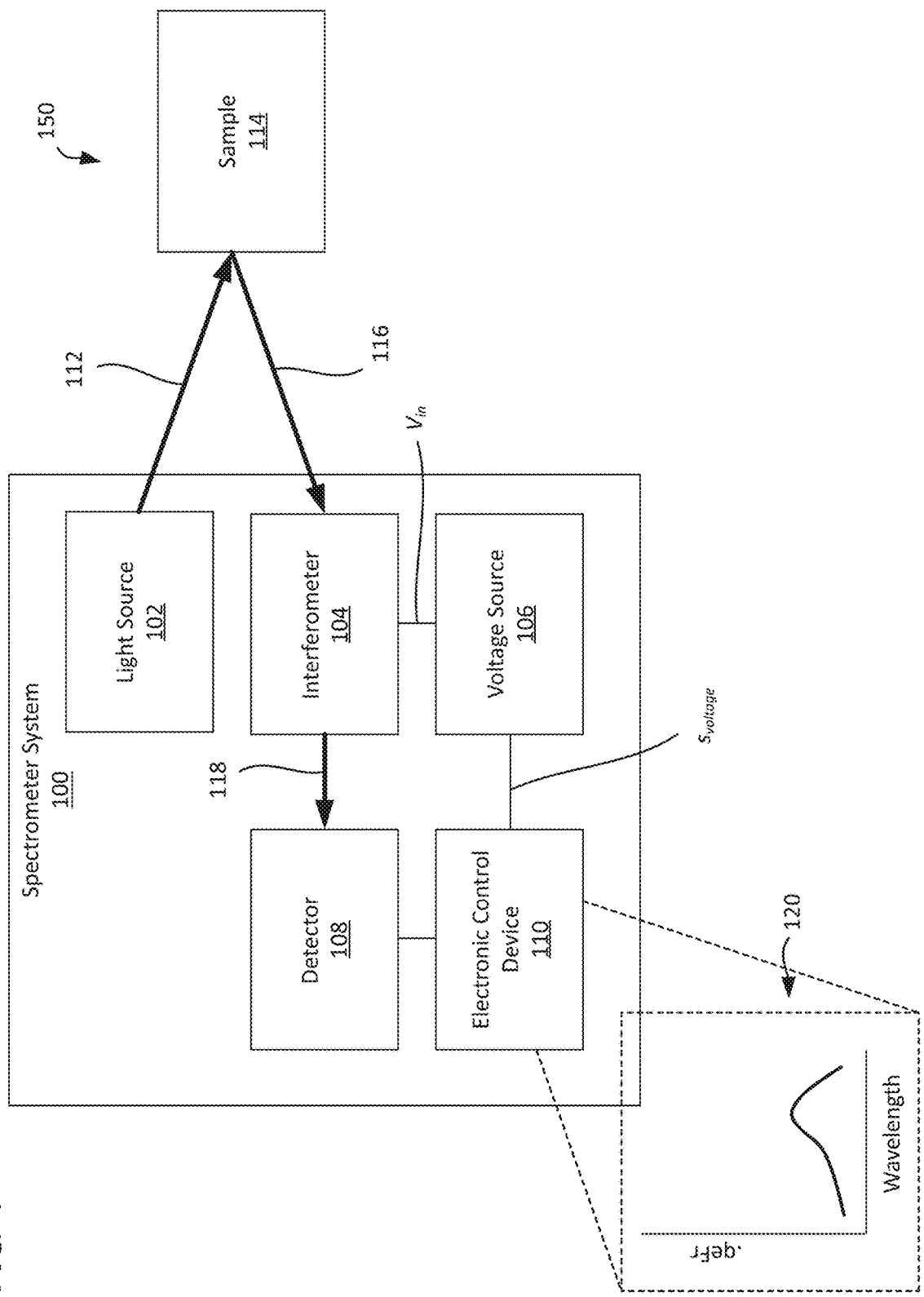
FIG. 1 is schematic diagram of an example spectrometer system.

FIG. 1 shows an example spectrometer system 100. The spectrometer system 100 can be implemented as a stand-alone device (e.g., as an individual instrument), or as part of another device (e.g., as a part of a multi-purpose device). In some cases, the spectrometer system 100 can be implemented as a part of a mobile device, such as a smart phone, a tablet computer, or a wearable computer.

As shown in FIG. 1, the spectrometer system 100 includes a light source 102, an interferometer 104, a voltage source 106, a detector 108, and an electronic control device 110. In an example usage of the spectrometer system 100, the light source 102 generates light 112, which is emitted towards a sample 114 (e.g., an object positioned in a sample region 150). At least some of the sample light 116 reflected by and/or transmitted through the sample 114 becomes incident on the interferometer 104. Based on an input voltage generated by the voltage source 106, the interferometer 104 selectively transmits a subset of the sample light 118 (e.g., sample light within a particular wavelength or range of wavelengths) to the detector 108. The detector 108 measures the characteristics of the subset of the sample light 118, and provides the measurements the electronic control device 110. Based on the measurements, the electronic control device 106 determines information regarding the sample 114 (e.g., a histogram 120 representing the spectral distribution of the subset of the sample light 118, characteristics of the sample 114, etc.).

The light source 102 is a component operable to generate light and emit the light toward the sample region 150. The light source 102 can include one or more light emitting elements. As an example, the light source 102 can include one or more light emitting diodes (LEDs), vertical cavity surface emitting lasers (VCSELs), organic light emitting diodes (OLEDs), or other devices that selectively generate light.

The interferometer 104 is a component operable to extract information from light using light interference. As an example, the interferometer can receive the sample light 116, and through a super-positioning of the sample light 116 according to different phases, selectively transmit the subset of the sample light 118 having a particular wavelength or range of wavelengths to the detector 108 for measurement. The interferometer 104 is "tunable," such that a system or user can specify a particular wavelength or ranges of wavelengths of light that is transmitted by the interferometer 118 to the detector 108. As an example, the output of the interferometer 104 can depend on an input voltage $V_{in}$ that is generated by the voltage source 106 and applied to the interferometer 104. The input voltage $V_{in}$ can be varied to adjust the wavelength or range of wavelengths of light that is selectively transmitted by the interferometer 104 to the detector 108.

The voltage source 106 is a component operable to generate the input voltage $V_{in}$. The voltage source 106 can include one or more digital and/or analog circuit components for generating voltage. In some cases, the voltage source 106 can include one or more batteries or electric generators. In some cases, the voltage source 106 can receive electric energy from an external source (e.g., an external power supply), and generate the input voltage $V_{in}$ using the received electric energy. In some cases, the voltage source 106 can be communicatively coupled to the electronic control device 110, and can generate an input voltage $V_{in}$ having a particular voltage value based on command signals $s_{voltage}$ received from the electronic control device 110.

The detector 108 is a component operable to measure the characteristics of the subset of sample light 118 received form the interferometer 104. In some cases, the detector 108 can include one or more photodetectors or other light sensitive sensors. The detector 108 can measure various characteristics of the subset of sample light 118. As an example, the detector 108 can measure the intensity of the light and/or the spectral characteristics of the reflected light with respect to certain wavelengths and/or ranges of wavelengths. In some cases, the detector 108 is operable to measure the subset of sample light 118 according to one or more discrete points in time. In some cases, the detector 108 is operable to measure light continuously, periodically, intermittently, or according to some other pattern.

The electronic control device 110 is a component operable to control one or more functions of the spectrometer system 110. For example, the electronic control device 110 can be communicatively coupled to the light source 102, and can send command signals to the light source 102 to selectively turn on or off the light source 102 (e.g., to generate light during selected periods of time, such as during a measurement operation) and/or specify the characteristics of the generated light (e.g., to generate light according to a specific pattern, spectral composition, etc.). As another example, the electronic control device 110 can be communicatively coupled to the voltage source 106, and can send command signals $s_{voltage}$ to the voltage source 106 to generate an input voltage $V_{in}$ having a particular voltage value (e.g., to tune the output of the interferometer 104). As another example, the electronic control device 110 can be communicatively coupled to the detector 108, and can obtain measurements from the detector 108.

Further, the electronic control device 110 can determine information from the sample 114 based on the measurements. For example, the electronic control device 110 can generate a histogram 120 representing the spectral distribution of the subset of the sample light 118. As another example, the electronic control device 110 can determine other characteristics of the sample 114 based on the measurements, such as the physical shape or profile of the sample, the characteristics of the surface of the sample, and/or the composition of the sample.

In some cases, the electronic control device 110 is implemented as a device separate from one or more of the other components of the spectrometer system 110. For example, the electronic control device 110 can be a computer system (e.g., a client computer system or a server computer system) or computer processor separate and distinct from one or more of the other components of the spectrometer system 100. In some cases, the electronic control device 110 can be implemented in conjunction with one or more of the other components of the spectrometer system 100 (e.g., as a single integrated device).

As described above, the output of the interferometer 104 can depend on the input voltage $V_{in}$ that is applied to the interferometer 104. The input voltage $V_{in}$ can be varied to adjust the wavelength or range of wavelengths of light that is selectively transmitted by the interferometer 104 to the detector 108.

Figure 2A:
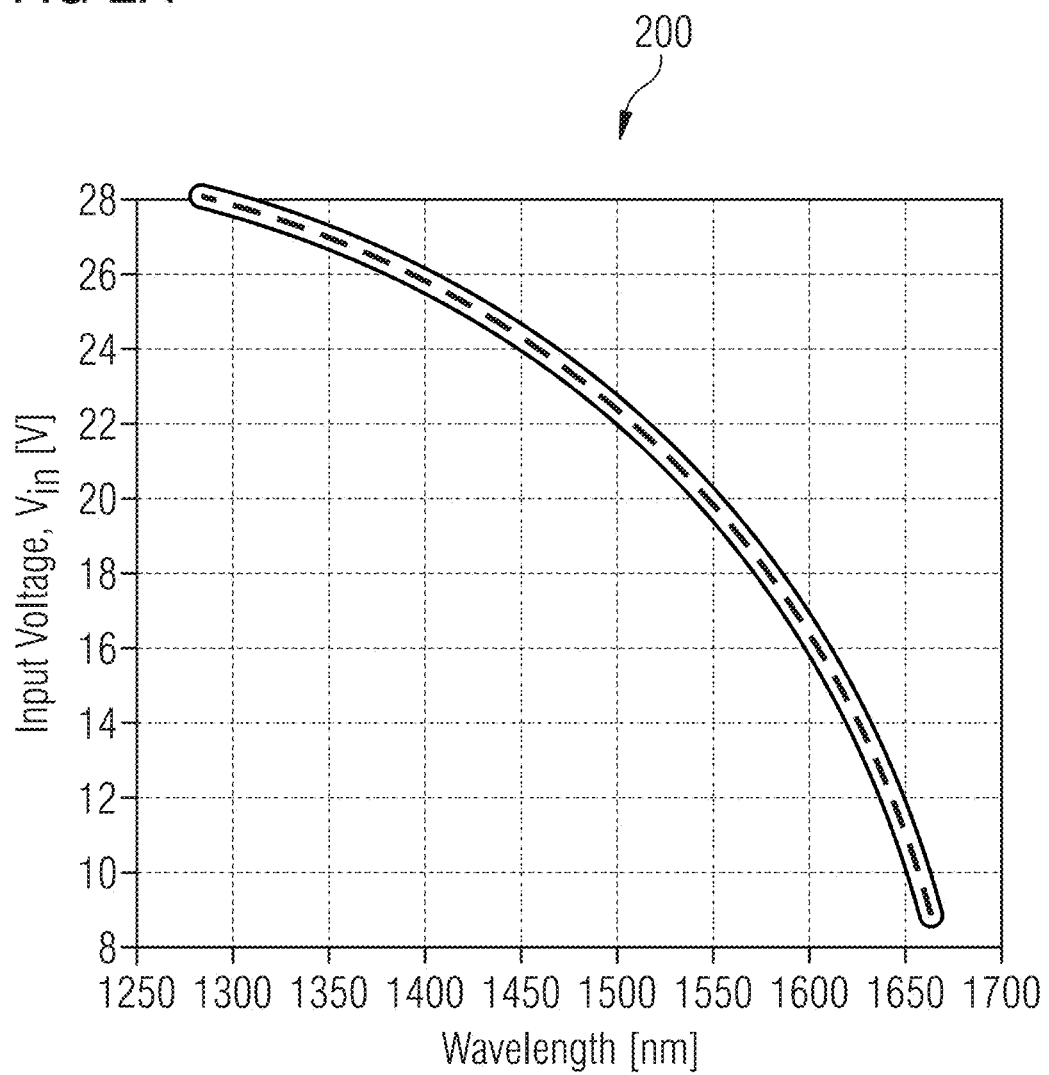
FIG. 2A is a plot showing an example relationship between the input voltage applied to an interferometer and a corresponding wavelength of light outputted by the interferometer.

In some cases, the relationship between the input voltage $V_{in}$ applied to an interferometer and the corresponding wavelength of light outputted by the interferometer is non-linear. For instance, FIG. 2A includes a plot 200 showing a relationship between the input voltage $V_{in}$ applied to the interferometer 104 and the corresponding wavelength of light outputted by the interferometer 104 for a spectrometer system including an example micro-electro-mechanical systems (MEMS)-based tunable Fabry-Pérot (FI) interferometer. In this example, applying an input voltage $V_{in}$ to the interferometer 104 would result in the output of light having a range of wavelengths with a center wavelength of approximately 1550 nm, while other wavelengths of light outside of the range are substantially not output by the interferometer. In this example, the relationship can be approximated by the equation:

$$V^2 = \left[\frac{2k}{\varepsilon_0 \varepsilon_a A} x(T-x)^2\right],$$

where k is a spring constant, x is the wavelength change (e.g., a displacement of the cavity of the interferometer), $\varepsilon_0$ is the vacuum permittivity, $\varepsilon_a$ is that relative static permittivity, A is the area of the equal parallel plates of the interferometer, V is the voltage applied between the electrodes, and T is a parameter related to the geometry and the electrical permittivity of the media under consideration $$(\text{e.g., } T = g - t_d\left(1 - \frac{\varepsilon}{\varepsilon_b}\right),$$

where g is a thickness of the cavity with no applied voltage, and $t_d$ is the thickness of the layer on top of the electrode, with a relative static permittivity of $\varepsilon_b$).

However, in some cases, the output of an interferometer can also depend on the temperature of the surrounding environment. Accordingly, in response to a particular input voltage, an interferometer may output light within different wavelengths or ranges of wavelengths due to temperature fluctuations in the surrounding environment. These variations can reduce the accuracy and/or precision of a spectrometer system's measurements, particularly when the spectrometer system is used in different environments and/or in an unregulated environment. For example, although an electronic control device 110 may specify that a certain wavelength of light be transmitted to the detector 108 for measurement, a different wavelength of light might be transmitted instead, resulting in variations in the measurements and/or errors in the interpretation of those measurements.

As an example, FIG. 2B shows a plot 210 depicting a relationship between (i) the input voltage $V_{in}$ applied to the interferometer 104, and (ii) the corresponding center wavelength of the range of wavelengths of light outputted by the interferometer 104 with respect to 7 different temperatures ranging from −40° C. and 85° C. (−40° C., −20° C., 5° C., 25° C., 45° C., 65° C., and 85° C.). As shown in FIG. 2B, in response to a particular input voltage $V_{in}$, an interferometer may output light within different ranges of wavelengths, depending on the temperature. Thus, the resulting measurements may vary due to temperature fluctuations during and between each measurement.

To enhance the performance of the spectrometer system 100, the spectrometer system 100 can calibrate the input voltage $V_{in}$ that is applied to the interferometer 104 based on a measured temperature of the surrounding environment. For example, a spectrometer system can determine a reference voltage $V_{ref}$ that, when applied to the interferometer, causes the interferometer 104 to output light within a certain wavelength or range of wavelengths (e.g., a wavelength or range of wavelengths selected by the electronic control device 110 or a user) respect to a particular reference temperature $T_{ref}$ (e.g., a fixed temperature). Further, the spectrometer system 100 can measure the temperature of the surrounding environment $T_m$, and determine a bias voltage $V_{bias}$ to compensate for the difference between the reference temperature $T_{ref}$ and the measured temperature $T_m$. The spectrometer system 100 can apply a calibrated input voltage (e.g., a sum of the reference voltage $V_{ref}$ and the bias voltage $V_{bias}$) to the interferometer 104, such that the interferometer 104 outputs the selected wavelength or range of wavelengths of light to the detector 108. This enables the spectrometer system 100 to compensate for fluctuations in temperature, and make more accurate and/or precise measurements with respect to the selected wavelength of range of wavelengths. Further, this enables the spectrometer system 100 to be used in a wider variety of environments and environmental conditions.

Figure 3:
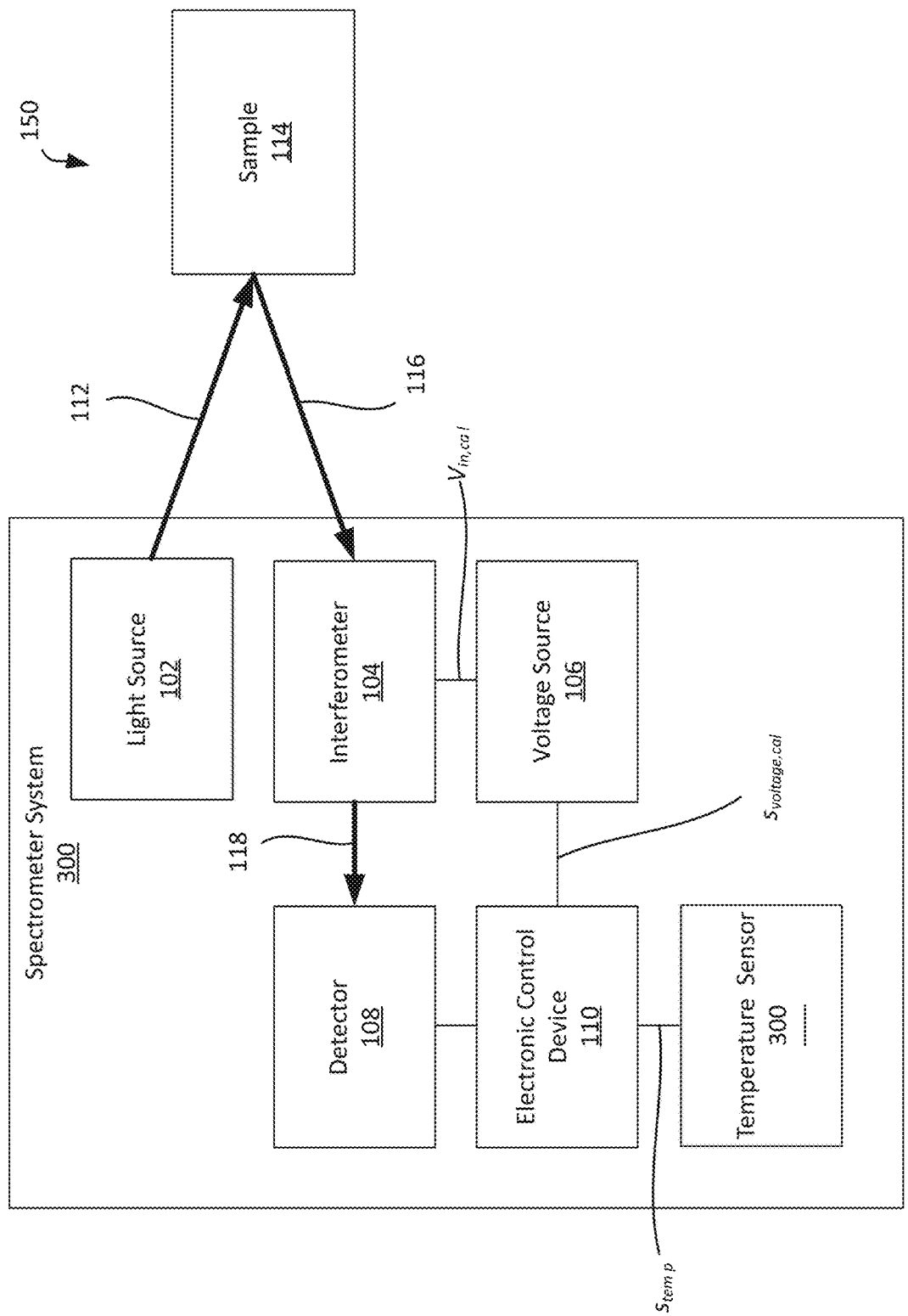
FIG. 3 is schematic diagram of another example spectrometer system.

As an example, FIG. 3 shows a spectrometer system 300 that calibrates the input voltage that is applied to its interferometer based on the temperature of the surrounding environment.

The spectrometer system 300 can be similar to the spectrometer system 100 described with respect to FIG. 1. For instance, the spectrometer system 100 can be implemented as a stand-alone device, or as part of another device. In some cases, the spectrometer system 100 can be implemented as a part of a mobile device, such as a smart phone, a tablet computer, or a wearable computer. Further, the spectrometer system 300 includes a light source 102, an interferometer 104, a voltage source 106, a detector 108, and an electronic control device 110. Some or all of these components can operate in a similar manner as described with respect to FIG. 1. In an example usage of the spectrometer system 300, the light source 102 generates light 112, which is emitted towards a sample 114 (e.g., an object positioned in a sample region 150). At least some of the sample light 116 reflected by and/or transmitted through the sample 114 becomes incident on the interferometer 104. Based on an input voltage generated by the voltage source 106, the interferometer 104 selectively transmits a subset of the sample light 118 (e.g., sample light within a particular wavelength or range of wavelengths) to the detector 108. The detector 108 measures the characteristics of the subset of the sample light 118, and provides the measurements the electronic control device 110. Based on the measurements, the electronic control device 106 determines information regarding the sample 114 (e.g., a histogram representing the spectral distribution of the subset of the sample light 118, characteristics of the sample 114, etc.).

In this example, the spectrometer system 300 also includes a temperature sensor 300 that is communicatively coupled to the electronic control device 110. The temperature sensor is operable to measure a temperature $T_m$ of the environment of the spectrometer system 300 (e.g., an ambient temperature), and output a sensor signal corresponding to the measured temperature to the electronic control device 110. As an example, the temperature sensor 300 can include one or more temperature-sensitive analog or digital components that output a variable sensor signal $s_{temp}$ indicative of the measured temperature $T_m$.

The electronic control device 110 can send command signals to the voltage source 106 based on the sensor signal $s_{temp}$. For example, the electronic control device 110 can determine a reference voltage $V_{ref}$ that, when applied to the interferometer, would cause the interferometer 104 to output sample light 118 within a selected wavelength or range of wavelengths with respect to a fixed reference temperature $T_{ref}$. The reference voltage $V_{ref}$ can be determined based on a look up table, a mathematical model, or other data indicating the relationship between (i) the reference voltage $V_{ref}$ and (ii) the corresponding wavelength or range of wavelengths that are output by the interferometer when the reference voltage $V_{ref}$ is applied at the reference temperature $T_{ref}$. In some cases, this relationship can be determined experimentally or empirically (e.g., by operating the interferometer 104 according to a fixed reference temperature, applying different reference voltages to the interferometer, and measuring the wavelength or wavelengths of light that are output by the interferometer 104 in response to the applied voltage).

Further, the electronic control device 110 can determine a bias voltage $V_{bias}$ to compensate for the difference between the reference temperature $T_{ref}$ and the temperature of the surrounding environment $T_m$, such that when the sum of the reference voltage $V_{ref}$ and the bias voltage $V_{bias}$ is applied to the interferometer 104 at the temperature of the surrounding environment $T_m$, the interferometer accurately outputs light within the selected wavelength or range of wavelengths.

Based on these determinations, the electronic control device 110 sends a command signal $s_{voltage,cal}$ to the voltage source 106, instructing the voltage source 106 to generate and apply a calibrated input voltage $V_{in,cal}$ (e.g., a sum of the reference voltage $V_{ref}$ and the bias voltage $V_{bias}$) to the interferometer 104. In response, the voltage source 106 generates and applies the calibrated input voltage $V_{in,cal}$ to the interferometer 104, causing the interferometer 104 to output light within the specified wavelength or range of wavelengths to the detector 108 (e.g., accurately accounting for the temperature of the environment). The detector 108 measures the characteristics of the transmitted light, and provides the measurements the electronic control device 110. Based on the measurements, the electronic control device 106 determines information regarding the sample 114.

In some cases, the bias voltage $V_{bias}$ can be the sum of (i) the temperature of the surrounding environment $T_m$ multiplied by a scalar value, and (ii) a constant value. For example, the bias voltage $V_{bias}$ can be determined using the relationship:

$$V_{bias}=aT_m+b,$$

where a is a scalar value, and b is a constant value. The values a and b can be determined experimentally or empirically. For example, several measurement trials can be conducted using the interferometer 104. During each trial, the interferometer 104 is subjected to a particular environmental temperature, and a particular reference voltage is applied to the interferometer 104 (e.g., a reference voltage that, when applied to the interferometer, would cause the interferometer 104 to output light within a selected wavelength or range of wavelengths with respect to a fixed reference temperature). The actual wavelength or wavelengths of light that are output by the interferometer 104 are measured. Based on this information, a determination is made that the reference voltage should be shifted or biased by a particular voltage value to output the selected wavelength or range of wavelengths for that environmental temperature. These trials can be repeated multiple times for different environmental temperatures, input voltages, and selected wavelengths or ranges of wavelengths. The values a and b can be calculated by identifying a relationship between (i) the temperature of the surrounding environment, and (ii) the corresponding amount of voltage that the reference voltage would need to be shifted or biased to cause the interferometers to output light accurately within the selected wavelength or ranges of wavelengths.

As described above, a reference voltage $V_{ref}$ can be shifted by a bias voltage $V_{bias}$ that is the sum of the temperature of the surrounding environment $T_m$ multiplied by a scalar value, and a constant value. This technique can provide various technical benefits. As an example, this enables a spectrometer system to be calibrated in a quick and efficient manner. For instance, it may be time and resource intensive to generate a look up table itemizing a comprehensive range of temperatures, input voltages applied to an interferometer, and corresponding wavelengths or ranges of wavelengths of light output by an interferometer. In comparison, it may be quicker and/or more efficient to estimate values a and b based on a limited number of trials (e.g., to estimate the bias voltage $V_{bias}$ based on the linear relationship described above), and apply a calibrated input voltage to the interferometer based on the estimated linear relationship. In some cases, this calibration technique may be particularly useful in calibrating the operation of spectrometers having certain spectral resolutions (e.g., having a granularity of 1 nm of greater).

Further, the linear relationship can be estimated using a limited number of representative devices. Subsequently, the operation of several other devices can be calibrated based on the estimated linear relationship. Accordingly, the operation of many different devices can be calibrated in a quick and efficient manner.

In the example shown in FIG. 3, the electronic control device 110 receives temperature measurements from the temperature sensor 300, and compensates for the effect of the environmental temperature of the output of the interferometer 104 (e.g., by sending command signals accounting for temperature variations to the voltage source 106). However, this need not be the case. For example, in some cases, the voltage source can directly compensate for the effect of the environmental temperature of the output of the interferometer 104 (e.g., by applying a bias voltage in addition to the reference voltage specified by the electronic control device 110).

Figure 4A:
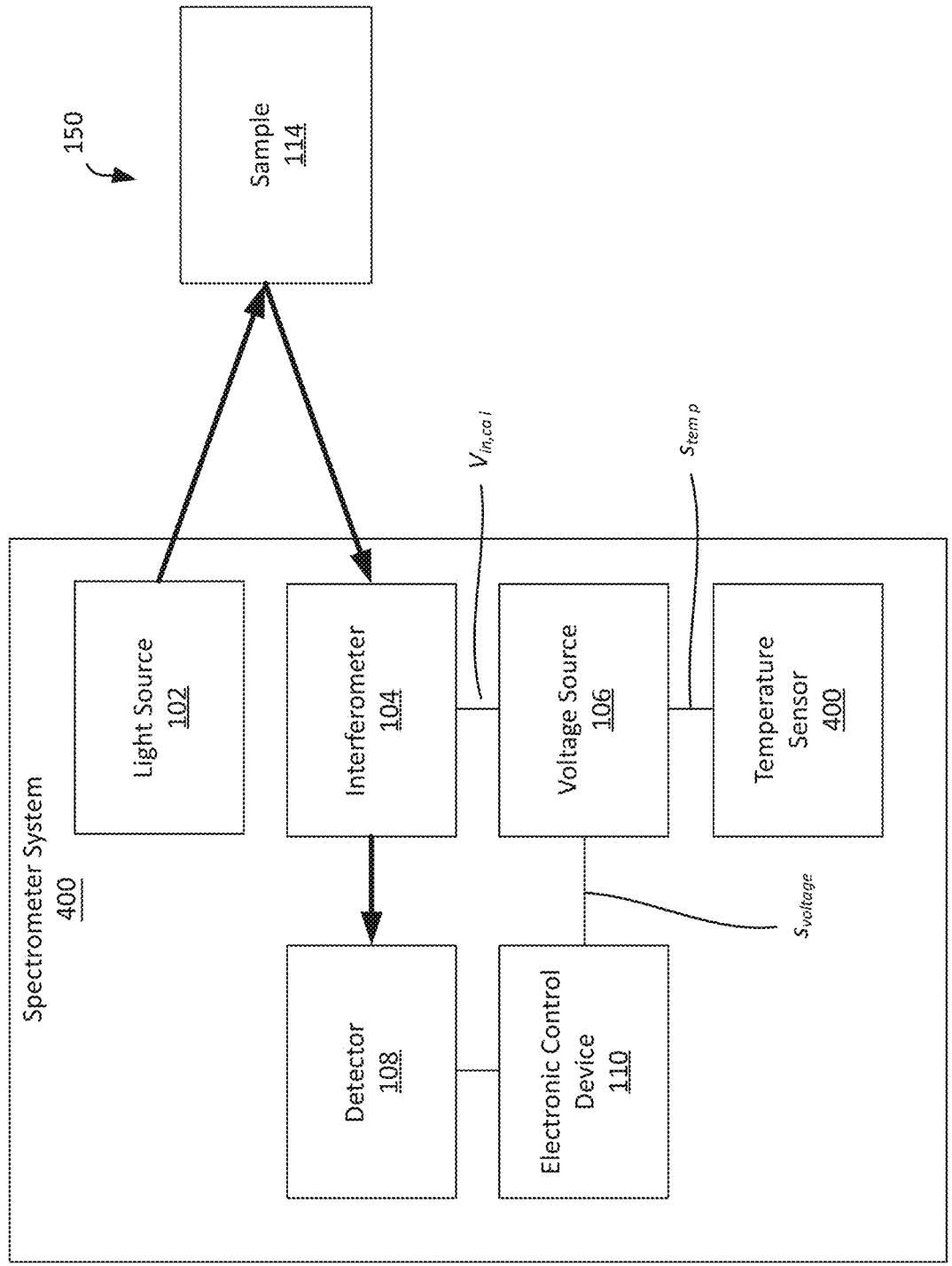
FIGS. 4A and 4B are schematic diagrams of another example spectrometer system.

As an example, FIG. 4A shows another spectrometer system 400 that calibrates the input voltage that is applied to its interferometer based on the temperature of the surrounding environment.

The spectrometer system 400 can be similar to the spectrometer systems 100 and 300 described with respect to FIGS. 1 and 3, respectively. For instance, the spectrometer system 400 can be implemented as a stand-alone device, or as part of another device. In some cases, the spectrometer system 400 can be implemented as a part of a mobile device, such as a smart phone, a tablet computer, or a wearable computer. Further, the spectrometer system 400 includes a light source 102, an interferometer 104, a voltage source 106, a detector 108, and an electronic control device 110. Some or all of these components can operate in a similar manner as described with respect to FIGS. 1 and 3. In an example usage of the spectrometer system 400, the light source 102 generates light 112, which is emitted towards a sample 114 (e.g., an object positioned in a sample region 150). At least some of the sample light 116 reflected by and/or transmitted through the sample 114 becomes incident on the interferometer 104. Based on an input voltage generated by the voltage source 106, the interferometer 104 selectively transmits a subset of the sample light 118 (e.g., sample light within a particular wavelength or range of wavelengths) to the detector 108. The detector 108 measures the characteristics of the subset of the sample light 118, and provides the measurements the electronic control device 110. Based on the measurements, the electronic control device 106 determines information regarding the sample 114 (e.g., a histogram representing the spectral distribution of the subset of the sample light 118, characteristics of the sample 114, etc.).

The electronic control device 110 can send a command signal $s_{voltage}$ to the voltage source 106 to select a particular wavelength or range of wavelengths of the sample light 118 that is transmitted by the interferometer 104 to the detector 108 for measurement. For example, the electronic control device 110 can determine a reference voltage $V_{ref}$ that, when applied to the interferometer, would cause the interferometer 104 to output sample light 118 within a selected wavelength or range of wavelengths with respect to a fixed reference temperature $T_{ref}$. Based on this determination, the electronic control device 110 can send a command signal $s_{voltage}$ to the voltage source 106, specifying the reference voltage $V_{ref}$.

The reference voltage $V_{ref}$ can be determined based on a look up table, a mathematical model, or other data indicating the relationship between (i) the reference voltage $V_{ref}$ and (ii) the corresponding wavelength or range of wavelengths that are output by the interferometer when the reference voltage $V_{ref}$ is applied at the reference temperature $T_{ref}$. In some cases, this relationship can be determined experimentally or empirically (e.g., by operating the interferometer 104 according to a fixed reference temperature, applying different reference voltages to the interferometer, and measuring the wavelength or wavelengths of light that are output by the interferometer 104 in response to the applied voltage).

In this example, the spectrometer system 400 also includes a temperature sensor 400 that is communicatively coupled to the voltage source 106. The temperature sensor is operable to measure a temperature $T_m$ of the environment of the spectrometer system 400 (e.g., an ambient temperature), and output a sensor signal corresponding to the measured temperature to the voltage source 106. As an example, the temperature sensor 300 can include one or more temperature-sensitive analog or digital components that output a variable sensor signal $s_{temp}$ indicative of the measured temperature $T_m$.

Based on the command signal $s_{voltage}$ and the measured temperature $T_m$, the voltage source 106 generates and applies a calibrated input voltage $V_{in,cal}$ to the interferometer 104, such that the interferometer 104 accurately outputs light within the selected wavelength or range of wavelengths. This can be performed using or more or electronic components.

Figure 4B:
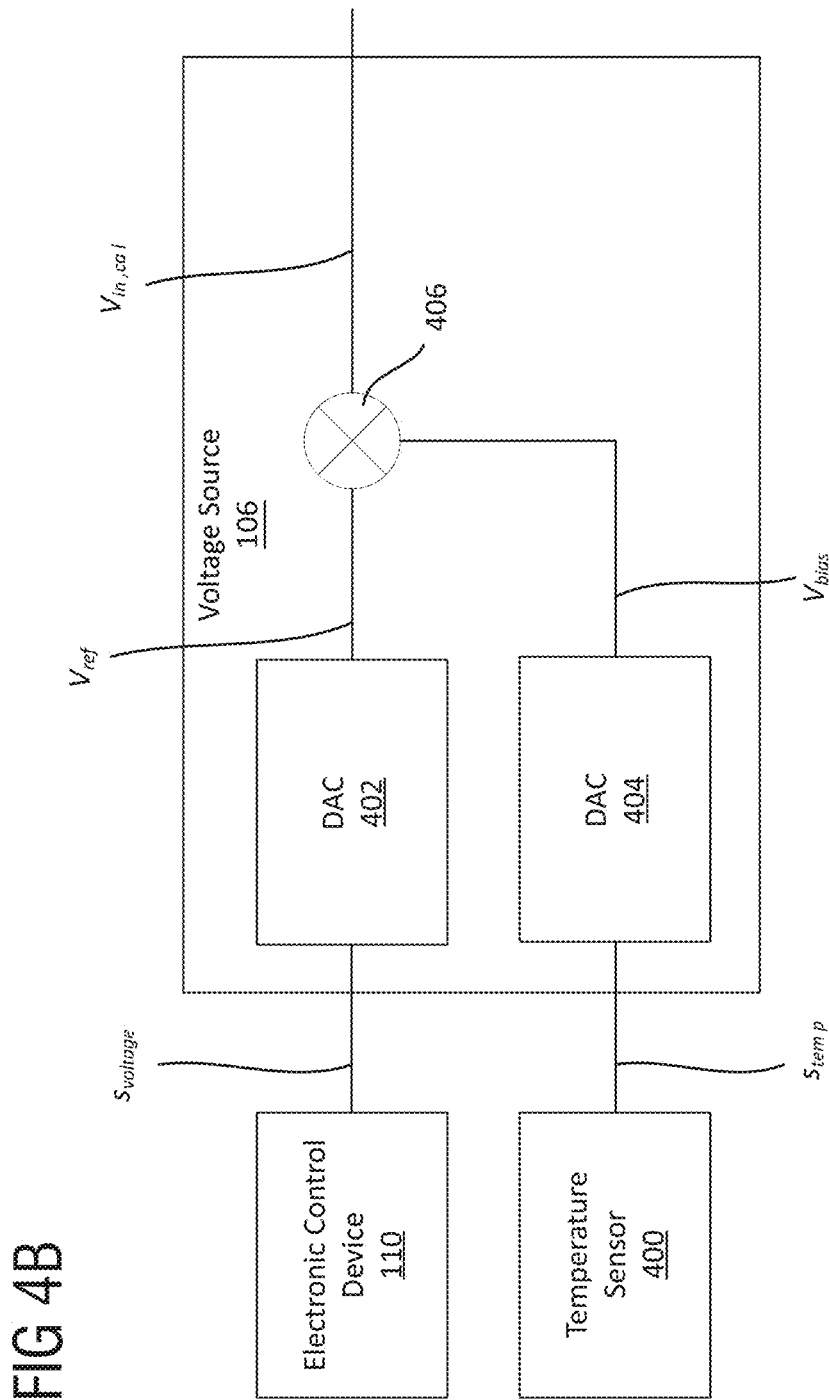

As an example, FIG. 4B shows a schematic diagram of the voltage source 106. As shown in FIG. 4B, the voltage source can include two digital-to-analog converters (DACs) 402 and 404, and a voltage summer 406.

The first DAC 402 is communicatively coupled to the electronic control device 110, and receives the command signal $s_{voltage}$ from the electronic control device 110 (e.g., a digital signal). In response, the first DAC 402 converts the command signal $s_{voltage}$ into its corresponding reference voltage $V_{ref}$. In some cases, the first DAC 402 can convert a particular command signal $s_{voltage}$ into its corresponding reference voltage $V_{ref}$ based on a look up table, a mathematical model, or other data indicating the relationship between the two values.

Further, the second DAC 404 is communicatively coupled to the temperature sensor 400, and receives the sensor signal $s_{temp}$ from the temperature sensor 400 (e.g., a digital signal). In response, the second DAC 404 converts the command signal $s_{temp}$ into a corresponding bias voltage $V_{bias}$. In some cases, the second DAC 404 can convert a particular sensor signal $s_{temp}$ into its corresponding bias voltage $V_{bias}$ based on a look up table, a mathematical model, or other data indicating the relationship between the two values.

The bias voltage $V_{bias}$ can be determined in a similar manner as described with respect to FIG. 3. For example, the bias voltage $V_{bias}$ can be selected to compensate for the difference between the reference temperature $T_{ref}$ and the temperature of the surrounding environment $T_m$, such that when the sum of the reference voltage $V_{ref}$ and the bias voltage $V_{bias}$ is applied to the interferometer 104 at the temperature of the surrounding environment $T_m$, the interferometer accurately outputs light within the selected wavelength or range of wavelengths.

Further, in some cases, the bias voltage $V_{bias}$ can be the sum of (i) the temperature of the surrounding environment $T_m$ multiplied by a scalar value, and (ii) a constant value. For example, the bias voltage $V_{bias}$ can be determined using the relationship:

$$V_{bias} = aT_m + b,$$

where a is a scalar value, and b is a constant value. The values a and b can be determined experimentally or empirically (e.g., in a similar manner as described with respect to FIG. 3).

The reference voltage $V_{ref}$ and the bias voltage $V_{bias}$ are summed together by the voltage summer 406, resulting in the calibrated input voltage $V_{in,cal}$. The calibrated input voltage $V_{in,cal}$ is applied to the interferometer 104, causing the interferometer 104 to output light within the specified wavelength or range of wavelengths to the detector 108 (e.g., accurately accounting for the temperature of the environment). The detector 108 measures the characteristics of the transmitted light, and provides the measurements the electronic control device 110. Based on the measurements, the electronic control device 106 determines information regarding the sample 114.

Example experimental data is shown in FIGS. 5A-5E.

Figure 5A:
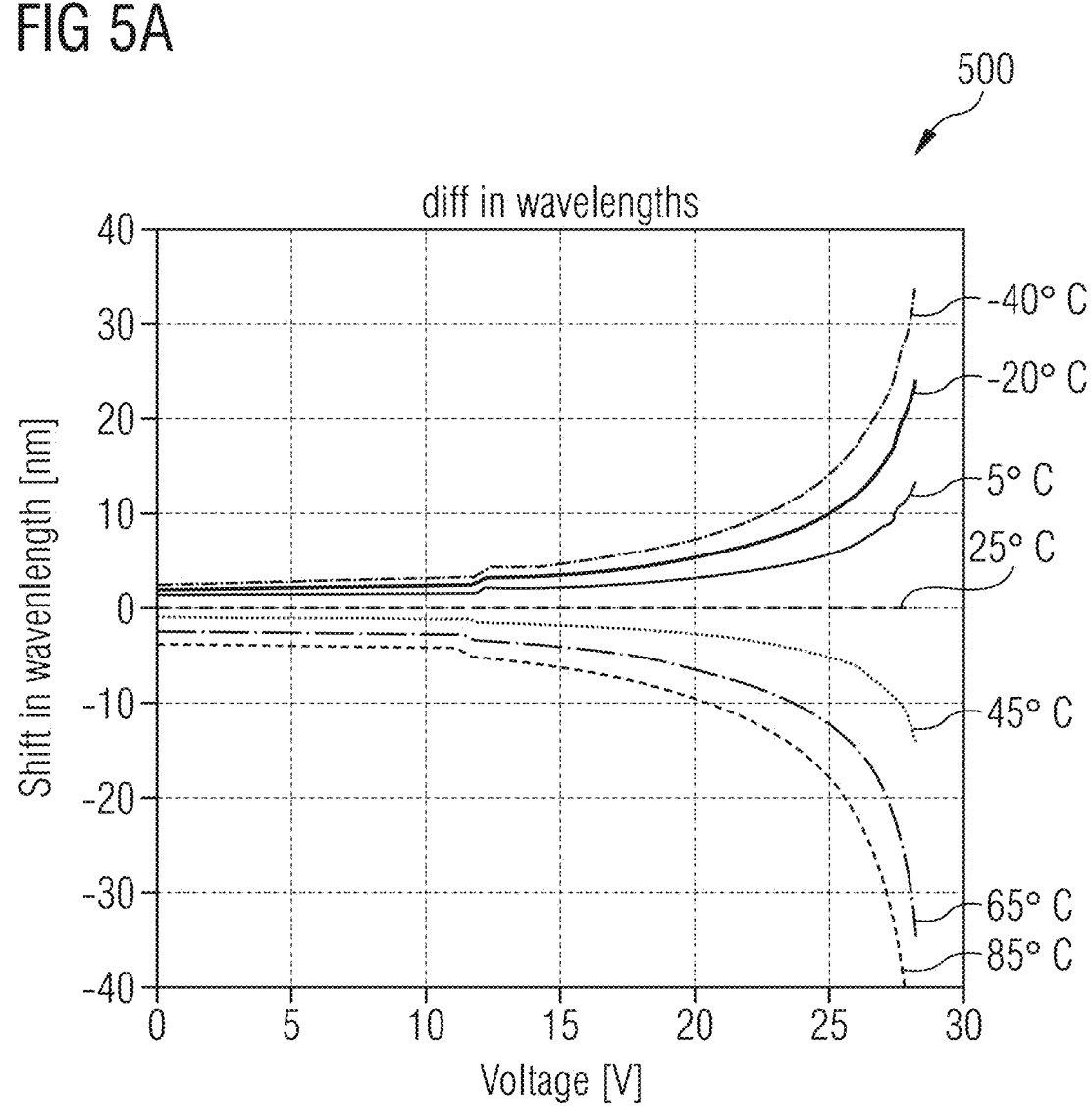

FIG. 5A shows a plot 500 depicting the relationship between (i) the reference voltage $V_{in}$ applied to an example interferometer, and (ii) the corresponding deviation between the expected center wavelength of light output by the interferometer and the actual center wavelengths of light output by the interferometer with respect to 7 different temperatures ranging from −40° C. and 85° C. As shown in FIG. 5A, the output exhibits little to no deviation at a temperature of 25° C. (e.g., corresponding to the reference temperature). However, the output exhibits deviations at other temperatures.

The deviation between the expected center wavelength of light output by the interferometer and the actual center wavelengths of light output by the interferometer is approximately proportional to the temperature plus a constant value, within certain ranges of wavelengths. For example, FIG. 5B shows a plot 510 depicting the relationship between (i) the desired center wavelength of light to be outputted by the interferometer, and (ii) the shift in voltage of reference voltage $V_{in}$ needed to output that desired center wavelength of light. As shown in FIG. 5B, for each temperature, the voltage shift is generally constant between 1300 nm and 1500 nm. Note that the traces in a wavelength range of 1500 nm and higher exhibit jagged artifacts due to an interpolation of values in the plotting process, and do not reflect the actual observed trend.

Figure 5C:
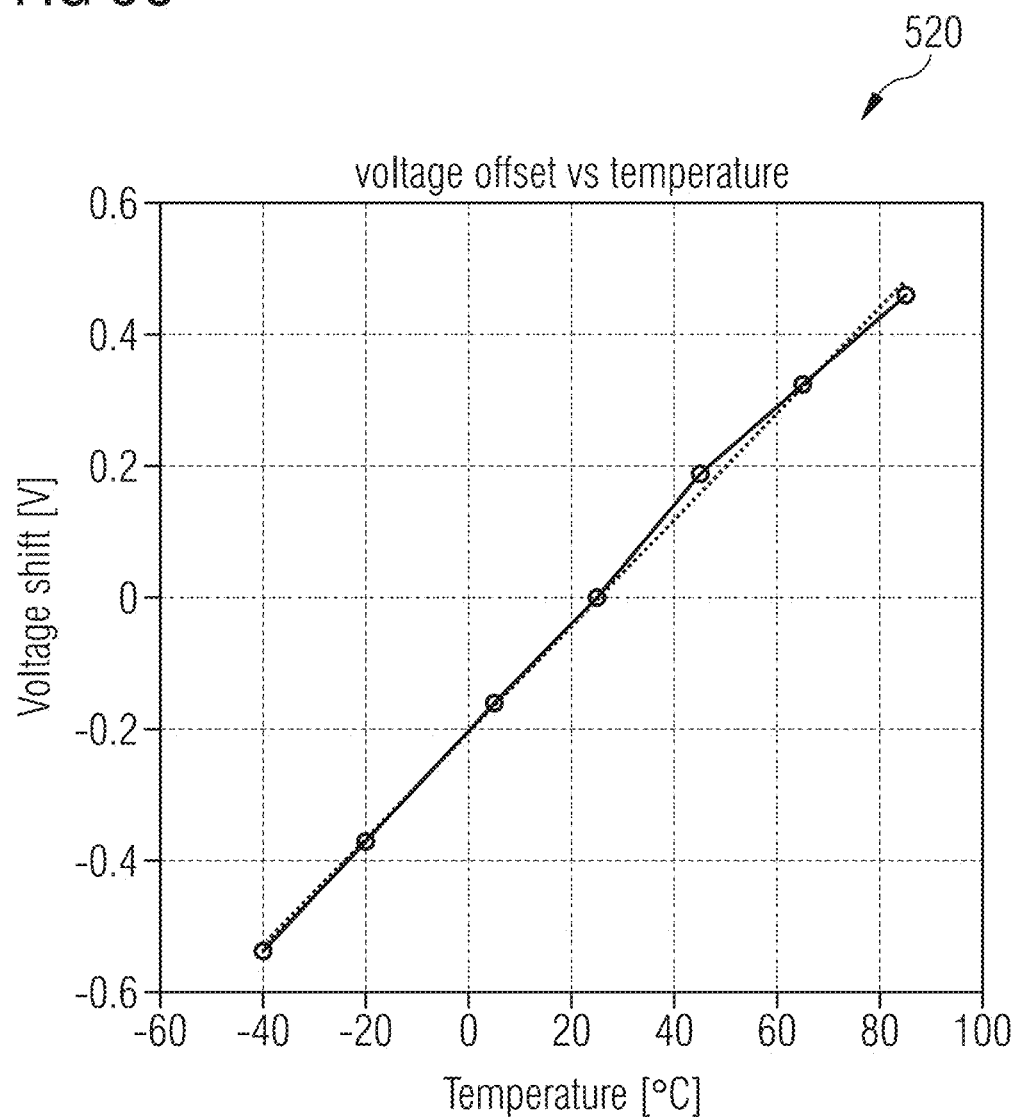

FIG. 5C shows a plot 520 depicting the relationship between (i) the temperature, and (ii) the shift in voltage of reference voltage $V_{in}$ needed to output that desired center wavelengths of light. Each of the circle points indicates a different trial that was performed, and the trend line shows a regression fitting of the points. As shown in FIG. 5C, the relationship is approximately linear. This relationship can be express mathematically as:

$$V_{bias}(T_m) = 8.055213076 \times 10^{-3} \times T - 0.2049443082,$$

with a correlation coefficient of r=0.9990684297, a coefficient of determination $R^2$=0.9981377272, and a residual sum of squares RSS=$1.481276766 \times 10^{-3}$.

Figure 5D:
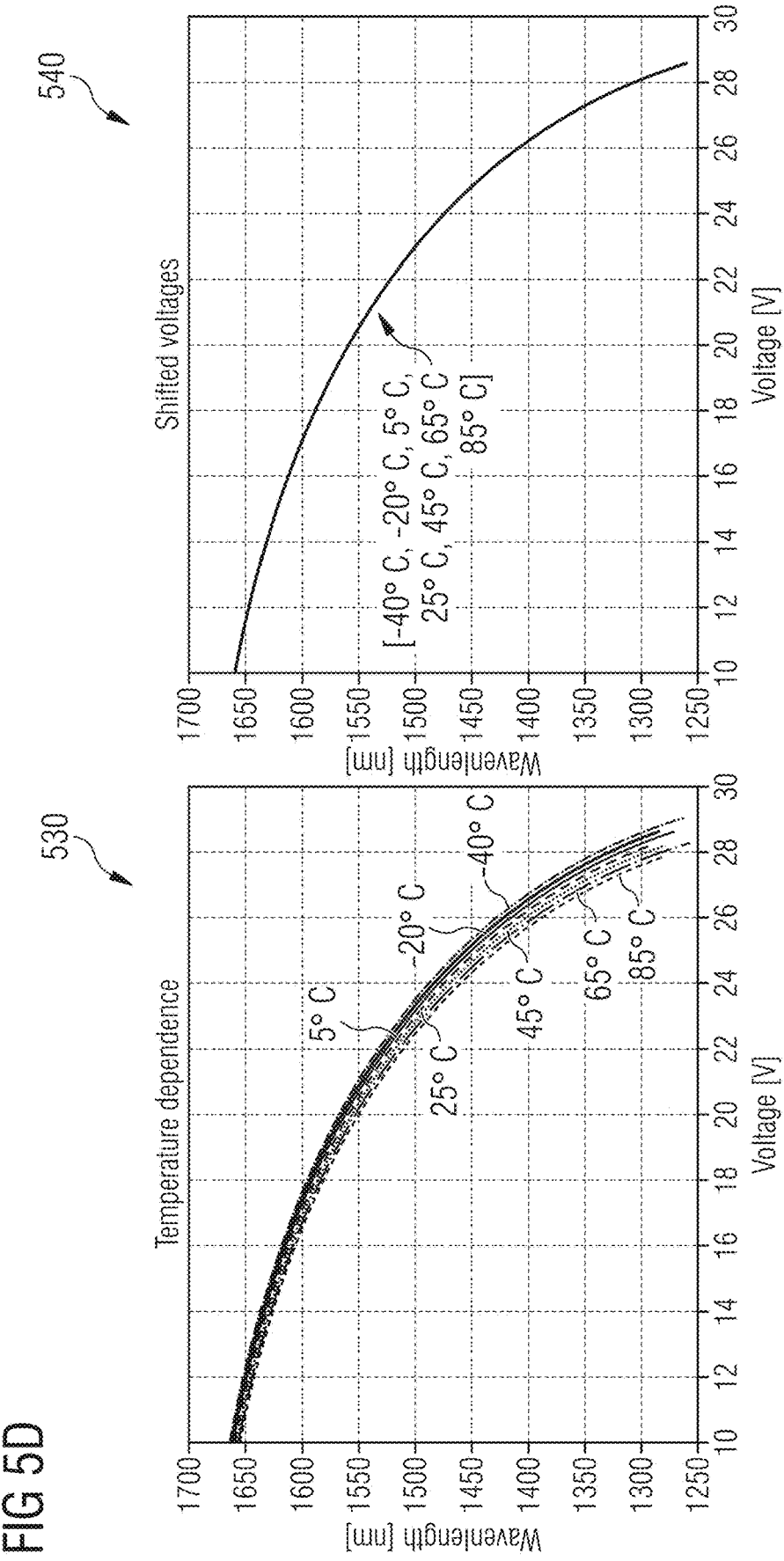

This linear relationship can be used to calibrate the input voltage applied to the interferometer, such that the interferometer accurately outputs light within the desired wavelengths. For example, FIG. 5D shows a plot 530 depicting the relationship between (i) the reference voltage $V_{in}$ applied to an example interferometer, and (ii) the corresponding center wavelength of light outputted by the interferometer with respect to 7 different temperatures ranging from −40° C. and 85° C. FIG. 5D also shows a plot 540 depicting the relationship between (i) the reference voltage $V_{in}$ applied to the interferometer (adjusted by a bias voltage $V_{bias}$ calculated using the linear relationship above), and (ii) the corresponding center wavelength of light outputted by the interferometer with respect to 7 different temperatures ranging from −40° C. and 85° C. As shown in FIG. 5D, the temperature-based variations in the interferometer's output (e.g., as shown in plot 530) are substantially removed after the reference voltage $V_{in}$ is shifted by an approximate bias voltage $V_{bias}$ (e.g., as shown in plot 540).

Figure 5E:
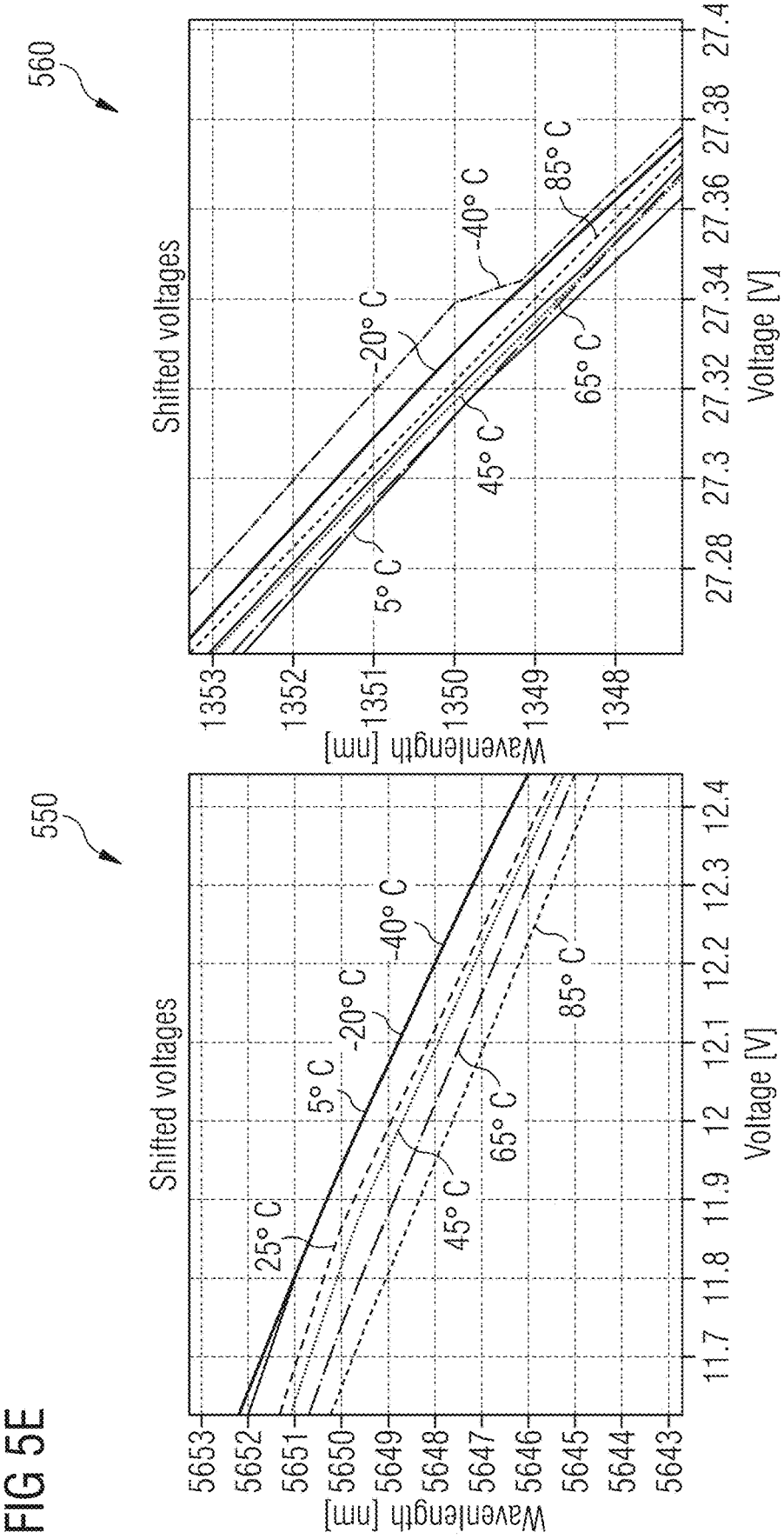

FIG. 5E shows plots 550 and 560, depicting the relationship of plot 540 in greater detail in two different voltage and wavelengths ranges. As shown in FIG. 5E, in this example, the interferometer exhibits temperature-based deviations in its output of less than 2 nm for certain longer wavelengths (e.g., in a range from approximately 564.4 nm to 565.2 nm), and temperature-based deviations in its output of less than 1 nm for certain shorter wavelengths (e.g., in a range from approximately 135.3 nm to 134.8 nm).

Although example experimental data is shown above, this data is merely an illustrative example. In practice, these relationships and the corresponding estimated linear relationship can differ, depending on the implementation.

In some cases, the linear relationship between the temperature and the bias voltage $V_{bias}$ can be estimated using one or more representative devices. Subsequently, the operation of several other devices can be calibrated based on the estimated linear relationship. Accordingly, the operation of many different devices can be calibrated in a quick and efficient manner.

Figure 6A:
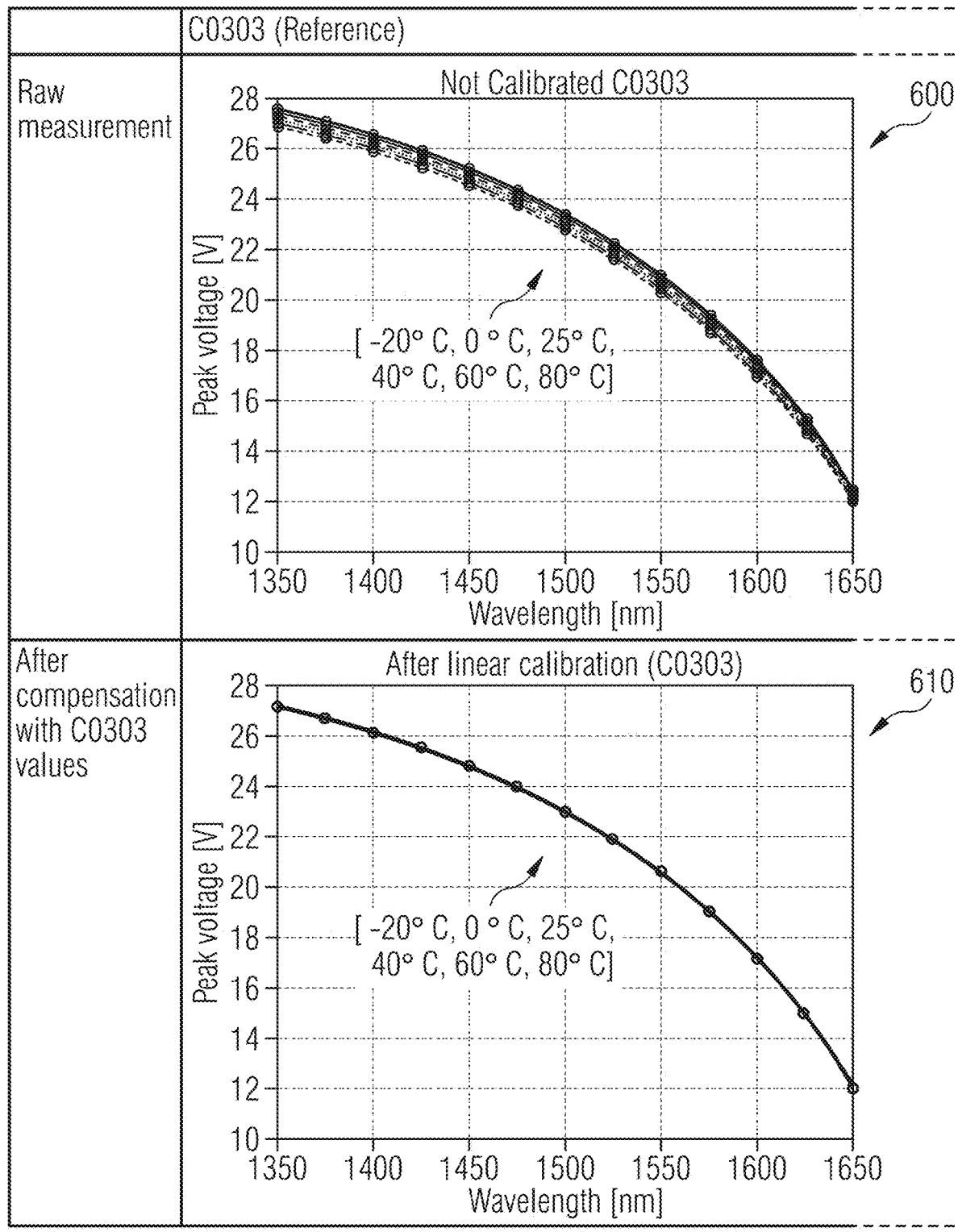
FIGS. 6A-6D show experimental data obtained during operation of example interferometers.

For example, FIG. 6A shows a plot 600 depicting the relationship between (i) the reference voltage $V_{in}$ applied to an example interferometer for a first device, and (ii) the corresponding center wavelength of light outputted by the interferometer with respect to 6 different temperatures ranging from −20° C. and 80° C. (−20° C., 0° C., 25° C., 40° C., 60° C., and 80° C.). FIG. 6A also shows a plot 620 depicting the relationship between (i) the reference voltage $V_{in}$ applied to the interferometer (adjusted by a bias voltage $V_{bias}$ calculated using a linear relationship calculated using the techniques described herein), and (ii) the corresponding center wavelength of light outputted by the interferometer with respect to 6 different temperatures ranging from −20° C. and 80° C. As shown in FIG. 6A, the temperature-based variations in the interferometer's output (e.g., as shown in plot 600) are substantially removed after the reference voltage $V_{in}$ is shifted by an approximate bias voltage $V_{bias}$ (e.g., as shown in plot 610).

Figure 6B:
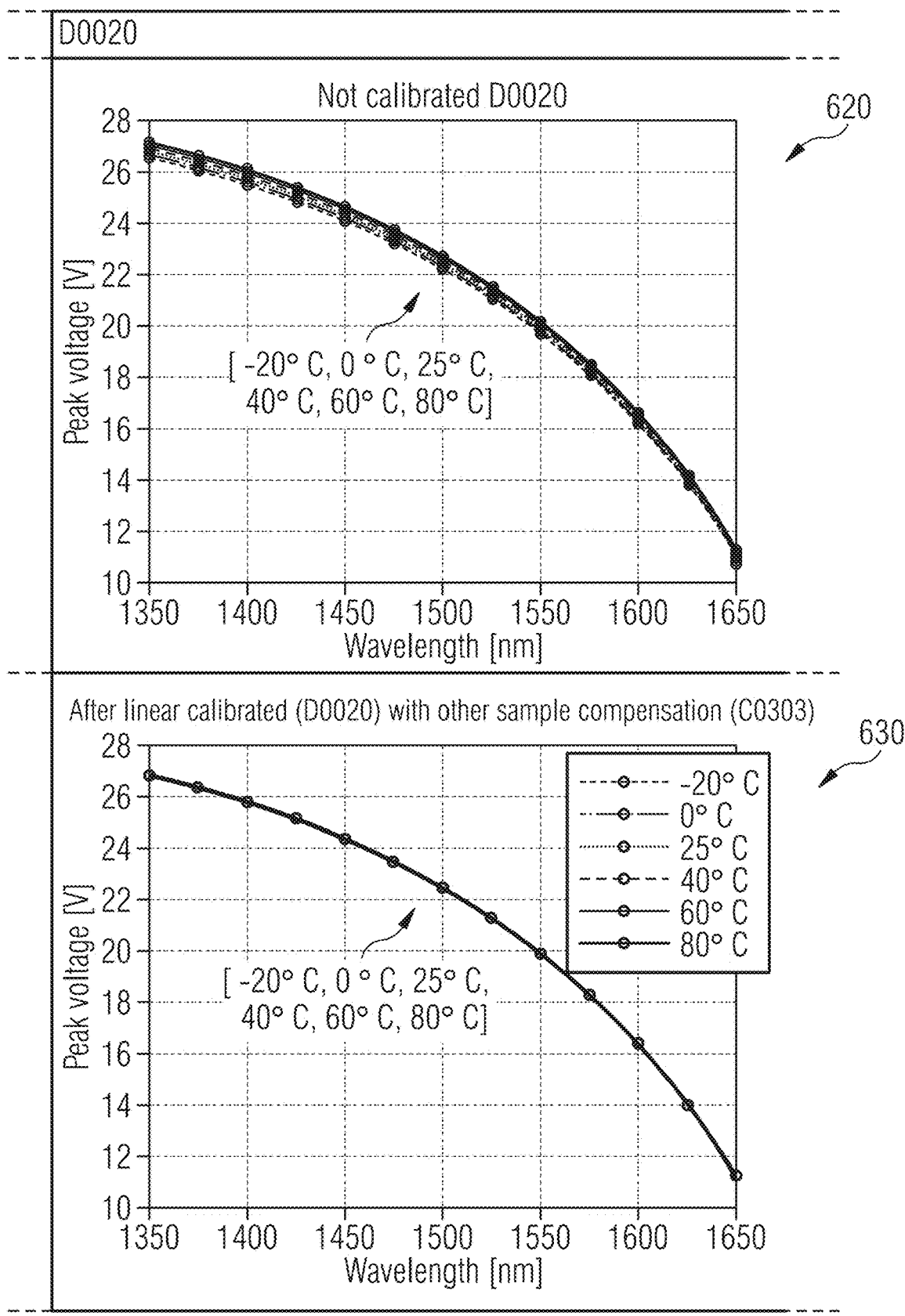
Figure 6C:
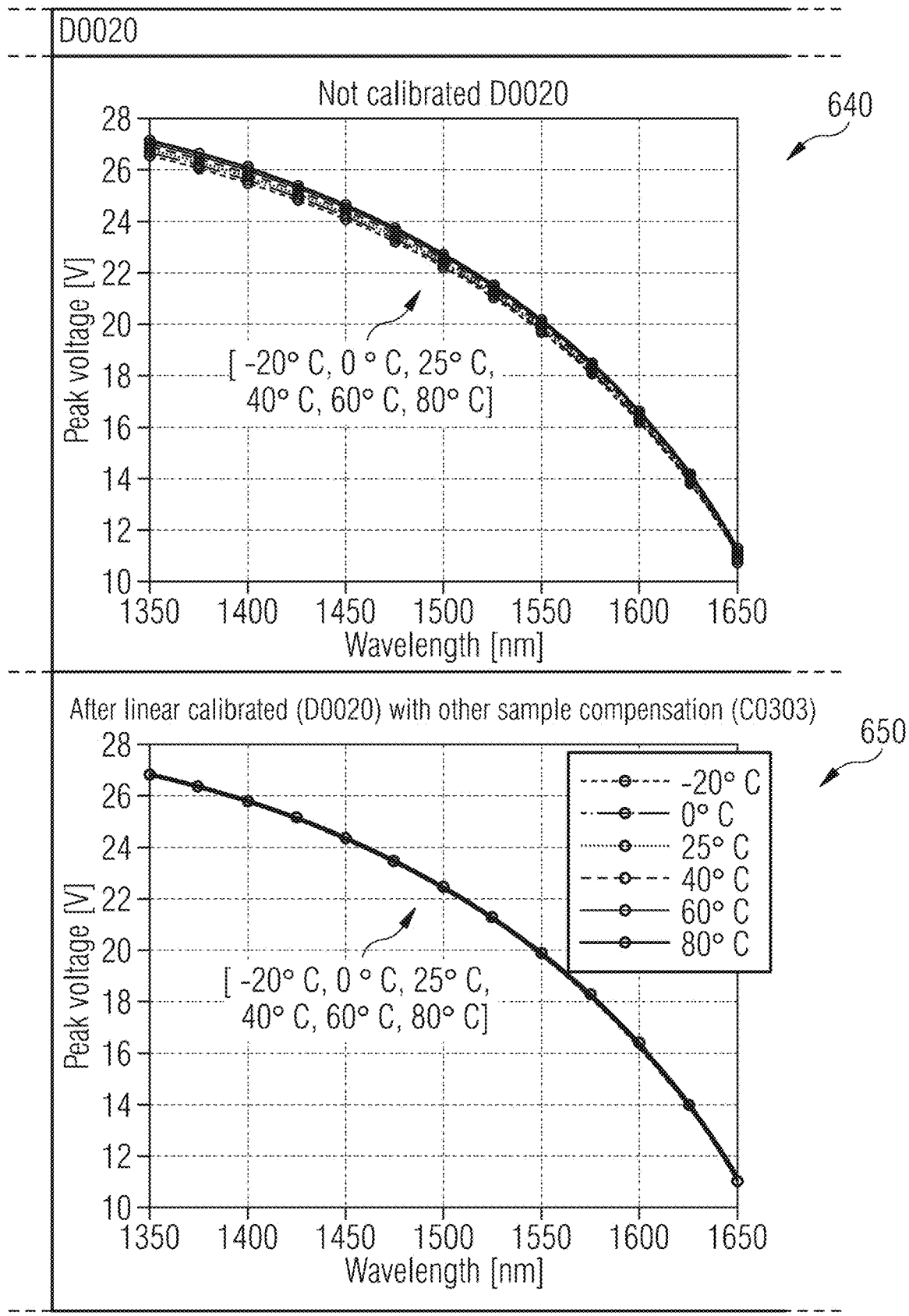
Figure 6D:
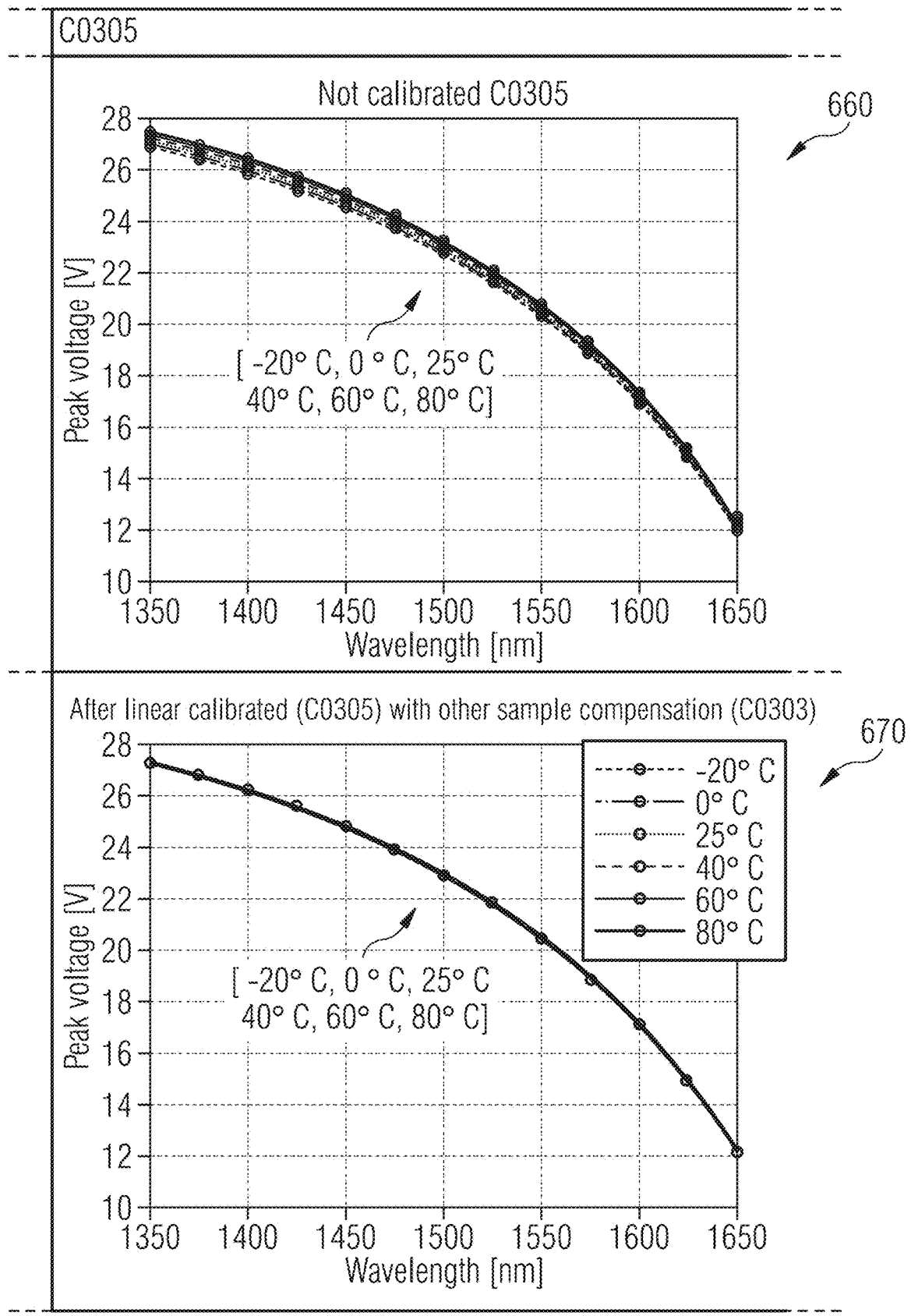

The estimated linear relationship for the first device can be used to calibrate the input voltages for one or more additional devices. For example, FIGS. 6B, 6C, and 6D show plots 620, 640, and 660, respectively, each depicting the relationship between (i) the reference voltage $V_{in}$ applied to an example interferometer for a different additional device, and (ii) the corresponding center wavelength of light outputted by the interferometer with respect to 6 different temperatures ranging from −20° C. and 80° C. Further, FIGS. 6B, 6C, and 6D also show plots 630, 650, and 670, respectively, each depicting the relationship between (i) the reference voltage $V_{in}$ applied to the respective interferometer (adjusted by a bias voltage $V_{bias}$ calculated using a linear relationship calculated using the first device using the techniques described herein), and (ii) the corresponding center wavelength of light outputted by the interferometer with respect to 6 different temperatures ranging from −20° C. and 80° C. As shown in FIGS. 6B-6D, the temperature-based variations in the interferometers' outputs (e.g., as shown in plots 620, 640, and 660) are substantially removed after the reference voltage $V_{in}$ is shifted by approximate bias voltages $V_{bias}$ (e.g., as shown in plots 630, 650, and 670).

In the example techniques described above, a calibrated input voltage $V_{in,cal}$ (e.g., a sum of a reference voltage $V_{ref}$ and a bias voltage $V_{bias}$) is applied to an interferometer to account for temperature-based variations in the output of the interferometer (e.g., an a priori calibration technique). However, this need not be the case. For instance, in some cases, the measurements of the detector can be modified after they are acquired to account for temperature-based variations in the output of the interferometer (e.g., an a posteriori calibration technique).

As an example, a spectrometer system can apply a particular reference voltage $V_{ref}$ to an interferometer selecting a particular wavelength or ranges of wavelengths for measurement, regardless of the temperature of the environment of the spectrometer system (e.g., in a similar manner as described with respect to FIG. 1). As no bias voltage is applied to the interferometer, the actual light output of the interferometer may differ from the selected wavelengths or ranges of wavelengths, depending on variations in temperature. Thus, the measurements obtained by the detector may correspond to a different wavelengths or range of wavelengths (e.g., wavelengths or ranges of wavelengths that are shifted by a particular amount relative to the selected wavelengths or ranges of wavelengths).

This deviation can be accounted for by modifying the measurements based on a measured temperature. For instance, for each measurement made by the detector, the electronic control device can generate a data record indicating (i) the measurement made by the detector, and (ii) the selected wavelengths or ranges of wavelengths of light associated with the measurement (e.g., the wavelength or ranges of wavelengths expected to be output by the detector, ignoring variations in temperature). Further, the electronic control device can determine the temperature of the spectrometer system during the measurement (e.g., using a temperature sensor 300 or 400, as described with respect to FIGS. 3, 4A, and 4B). Based on this information, the electronic control device can determine the actual wavelengths or ranges of wavelengths of light output by the interferometer (e.g., due to a temperature-induced shift in the output). This can be determined, for example, using based on a look up table, a mathematical model, or other data indicating the relationship between the two values as a function of the measured temperature. Further, the electronic control device can modify the data record to include an indication of the actual wavelengths or ranges of wavelengths of light associated with the measurement (e.g., by including an additional data field in the data record and/or replacing an existing data field in the data record). Accordingly, the measurement is calibrated a posteriori to account for the temperature, and subsequently can be used to determine the characteristics of the sample.

Example Processes

An example process 700 for using a spectrometer system is shown in FIG. 7. The process 700 can be performed to measure a spectral distribution of light reflected from and/or transmitted through a sample. In some cases, the process 700 can be performed by one or more of the spectrometer systems shown in FIGS. 3, 4A, and 4B.

In the process 700, light is emitted towards a sample region using a light source of a spectrometer (step 710).

Sample light that is at least one of light reflected by or transmitted through an object in the sample region is received by an interferometer of the spectrometer (step 720). The sample light has a first range of wavelengths.

A subset of the sample light is transmitted from the interferometer to a detector of the spectrometer (step 730). The subset of the sample light has a second range of wavelengths. The second range of wavelengths is a subset of the first range of wavelengths.

Transmitting the subset of the sample light can include one or more steps. For example, transmitting the subset of sample can include determining a reference voltage corresponding to the second range of wavelengths and a reference temperature, and determining, using a temperature sensor, a temperature of an environment of the spectrometer. Transmitting the subset of sample also can include determining a bias voltage corresponding to a difference between the reference temperature and the temperature of the environment of the spectrometer, and applying, to the interferometer, an input voltage corresponding to the sum of the reference voltage and the bias voltage;

The subset of the sample light is measured using the detector (step 730).

A spectral distribution of light corresponding to the object based on the measured subset of the sample light is determined using an electronic control device (step 740).

In some implementations, the bias voltage can be a sum of (i) the temperature of the environment of the spectrometer multiplied by a scalar value, and (ii) a constant value. For example, the bias voltage $V_{bias}$ can be determined using the relationship:

$$V_{bias} = aT_m + b,$$

where a is a scalar value, and b is a constant value.

In some implementations, the reference voltage can correspond to a second input voltage that, when applied to the interferometer, causes the interferometer to transmit the subset of the sample light when the temperature of the environment of the spectrometer is the reference temperature.

In some implementations, applying the input voltage can include generating, using the electronic control device, a command signal instructing a voltage source to apply the input voltage to the interferometer, and applying, using the voltage source in response to the command signal, the voltage source to the interferometer (e.g., as described with respect to FIG. 3).

In some implementations, applying the input voltage can include generating, using the electronic control device, a command signal instructing a voltage source to generate the reference voltage, and generating, using the voltage source in response to the command signal, the reference voltage. Further, applying the input voltage can include generating, using the voltage source, the bias voltage based on the measured temperature of the environment of the spectrometer, and applying, using the voltage source in response to the command signal, the sum of the reference voltage and the bias voltage to the interferometer (e.g., as described with respect to FIGS. 4A and 4B).

Example Systems

Some implementations of the subject matter and operations described in this specification can be implemented in digital electronic circuitry, or in computer software, firmware, or hardware, including the structures disclosed in this specification and their structural equivalents, or in combinations of one or more of them. For example, in some implementations, one or more components of the spectrometer systems 100, 300, or 400 (e.g., the electronic control device 110) can be implemented using digital electronic circuitry, or in computer software, firmware, or hardware, or in combinations of one or more of them. In another example, the processes shown in FIG. 7 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

FIG. 8 shows an example computer system 800 that includes a processor 810, a memory 820, a storage device 830 and an input/output device 840. Each of the components 810, 820, 830 and 840 can be interconnected, for example, by a system bus 850. In some implementations, the computer system 800 can be used to control the operation of a spectrometer. For example, the electronic control device 110 shown in FIGS. 1, 3, 4A, and 4B can include a computer system 800 to control the operation of one or more components of a spectrometer and/or process measurement data. The processor 810 is capable of processing instructions for execution within the system 800. In some implementations, the processor 810 is a single-threaded processor, a multi-threaded processor, or another type of processor. The processor 810 is capable of processing instructions stored in the memory 820 or on the storage device 830. The memory 820 and the storage device 830 can store information within the system 800.

The input/output device 840 provides input/output operations for the system 800. In some implementations, the input/output device 840 can include one or more of a network interface device, e.g., an Ethernet card, a serial communication device, e.g., an RS-232 port, and/or a wireless interface device, e.g., an 802.11 card, a 3G wireless modem, a 4G wireless modem, a 5G wireless modem, etc. In some implementations, the input/output device can include driver devices configured to receive input data and send output data to other input/output devices, e.g., keyboard, printer and display devices 860. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, various modifications may be made without departing from the spirit and scope of the invention. Accordingly, other embodiments are within the scope of the claims.

What is claimed is:

1. A method comprising:
emitting, using a light source of a spectrometer, light towards a sample region; receiving, at an interferometer of the spectrometer, sample light that is at least one of light reflected by or transmitted through an object in the sample region, the sample light having a first range of wavelengths;
transmitting, from the interferometer to a detector of the spectrometer, a subset of the sample light, the subset of the sample light having a second range of wavelengths, the second range of wavelengths being a subset of the first range of wavelengths, wherein transmitting the subset of the sample light comprises:
  determining a reference voltage corresponding to the second range of wavelengths and a reference temperature,
  determining, using a temperature sensor, a temperature of an environment of the spectrometer,
  determining a bias voltage corresponding to a difference between the reference temperature and the temperature of the environment of the spectrometer, and
  applying, to the interferometer, an input voltage corresponding to the sum of the reference voltage and the bias voltage, such that the interferometer selects the second range of wavelengths with respect to the temperature of the environment of the spectrometer;
the method further comprising:
measuring, using the detector, the subset of the sample light; and
determining, using an electronic control device, a spectral distribution of light corresponding to the object based on the measured subset of the sample light.

2. The method of claim 1, wherein the bias voltage is a sum of (i) the temperature of the environment of the spectrometer multiplied by a scalar value, and (ii) a constant value.

3. The method of claim 1, wherein the reference voltage corresponds to a second input voltage that, when applied to the interferometer, causes the interferometer to transmit the subset of the sample light when the temperature of the environment of the spectrometer is the reference temperature.

4. The method of claim 1, wherein applying the input voltage comprises:
generating, using the electronic control device, a command signal instructing a voltage source to apply the input voltage to the interferometer, and
applying, using the voltage source in response to the command signal, the voltage source to the interferometer.

5. The method of claim 1, wherein applying the input voltage comprises:
generating, using the electronic control device, a command signal instructing a voltage source to generate the reference voltage,
generating, using the voltage source in response to the command signal, the reference voltage,
generating, using the voltage source, the bias voltage based on the measured temperature of the environment of the spectrometer, and
applying, using the voltage source in response to the command signal, the sum of the reference voltage and the bias voltage to the interferometer.

6. A system comprising:
a light source;
an interferometer;
a detector; and
an electronic control device,
wherein the light source is operable to emit light towards a sample region,
wherein the interferometer is operable to:
receive sample light that is at least one of light reflected by or transmitted through an object in the sample region, the sample light having a first range of wavelengths, and
transmit, from the interferometer to the detector, a subset of the sample light, the subset of the sample light having a second range of wavelengths, the second range of wavelengths being a subset of the first range of wavelengths, wherein transmitting the subset of the sample light comprises:
  determining a reference voltage corresponding to the second range of wavelengths and a reference temperature,
  determining, using a temperature sensor, a temperature of an environment of the spectrometer,
  determining a bias voltage corresponding to a difference between the reference temperature and the temperature of the environment of the spectrometer, and
  applying, to the interferometer, an input voltage corresponding to the sum of the reference voltage and the bias voltage, such that the interferometer selects the second range of wavelengths with respect to
  the temperature of the environment of the spectrometer,
wherein the detector is operable to measure the subset of the sample light, and
wherein the electronic control device is operable to determine a spectral distribution of light corresponding to the object based on the measured subset of the sample light.

7. The system of claim 6, wherein the bias voltage is a sum of (i) the temperature of the environment of the spectrometer multiplied by a scalar value, and (ii) a constant value.

8. The system of claim 6, wherein the reference voltage corresponds to a second input voltage that, when applied to the interferometer, causes the interferometer to transmit the subset of the sample light when the temperature of the environment of the spectrometer is the reference temperature.

9. The system of claim 6, wherein the system further comprises a voltage source,
and
  wherein applying the input voltage comprises:
    generating, using the electronic control device, a command signal instructing a voltage source to apply the input voltage to the interferometer, and
    applying, using the voltage source in response to the command signal, the voltage source to the interferometer.

10. The system of claim 6, wherein the system further comprises a voltage source,
and
  wherein applying the input voltage comprises:
    generating, using the electronic control device, a command signal instructing a voltage source to generate the reference voltage,
    generating, using the voltage source in response to the command signal, the reference voltage, generating, using the voltage source, the bias voltage based on the measured temperature of the environment of the spectrometer, and applying, using the voltage source in response to the command signal, the sum of the reference voltage and the bias voltage to the interferometer.

\* \* \* \* \*